(12) United States Patent
Zhao et al.

(10) Patent No.: US 10,726,587 B2
(45) Date of Patent: Jul. 28, 2020

(54) SYSTEM AND METHOD FOR IMAGE CONVERSION

(71) Applicant: SHENZHEN UNITED IMAGING HEALTHCARE CO., LTD., Shanghai (CN)

(72) Inventors: Qianlong Zhao, Shanghai (CN); Guotao Quan, Shanghai (CN); Xiang Li, Shanghai (CN)

(73) Assignee: SHANGHAI UNITED IMAGING HEALTHCARE CO., LTD., Shanghai (CN)

( * ) Notice: Subject to any disclaimer, the term of this patent is extended or adjusted under 35 U.S.C. 154(b) by 129 days.

(21) Appl. No.: 15/793,958

(22) Filed: Oct. 25, 2017

(65) Prior Publication Data
US 2019/0035118 A1    Jan. 31, 2019

Related U.S. Application Data

(63) Continuation of application No. PCT/CN2017/095071, filed on Jul. 28, 2017.

(51) Int. Cl.
*G06K 9/00* (2006.01)
*G06T 11/00* (2006.01)
(Continued)

(52) U.S. Cl.
CPC .......... *G06T 11/008* (2013.01); *G06T 3/4046* (2013.01); *G06T 3/4076* (2013.01); *G06T 5/002* (2013.01); *G06T 5/50* (2013.01); *G06T 11/005* (2013.01); *G06T 11/006* (2013.01); *G06T 2207/10081* (2013.01); *G06T 2207/20081* (2013.01); *G06T 2207/20084* (2013.01)

(58) Field of Classification Search
CPC ... G06T 11/008; G06T 3/4046; G06T 3/4076; G06T 5/002; G06T 5/50; G06T 11/005; G06T 11/006; G06T 2207/10081
USPC ......................................................... 382/156
See application file for complete search history.

(56) References Cited

U.S. PATENT DOCUMENTS

| 7,876,874 | B2 * | 1/2011 | Goto ...................... A61B 6/032 378/5 |
| 8,952,333 | B2 | 2/2015 | Yu et al. |

(Continued)

OTHER PUBLICATIONS

International Search Report for PCT/CN2017/095071 dated Apr. 18, 2018, 4 pages.
(Continued)

*Primary Examiner* — Jonathan S Lee
(74) *Attorney, Agent, or Firm* — Metis IP LLC

(57) ABSTRACT

A method may include obtaining a first set of projection data with respect to a first dose level; reconstructing, based on the first set of projection data, a first image; determining a second set of projection data based on the first set of projection data, the second set of projection data relating to a second dose level that is lower than the first dose level; reconstructing a second image based on the second set of projection data; and training a first neural network model based on the first image and the second image. In some embodiments, the trained first neural network model may be configured to convert a third image to a fourth image, the fourth image exhibiting a lower noise level and corresponding to a higher dose level than the third image.

20 Claims, 11 Drawing Sheets

(51) Int. Cl.
*G06T 3/40* (2006.01)
*G06T 5/00* (2006.01)
*G06T 5/50* (2006.01)

(56) References Cited

U.S. PATENT DOCUMENTS

| | | | |
|---|---|---|---|
| 2010/0067772 A1* | 3/2010 | Kitamura | A61B 6/482 382/132 |
| 2012/0224760 A1* | 9/2012 | Goshen | G06T 5/003 382/131 |
| 2013/0089252 A1 | 4/2013 | Shechter | |
| 2014/0198892 A1* | 7/2014 | Yamakawa | A61B 6/032 378/4 |
| 2014/0376691 A1 | 12/2014 | Hoernig | |
| 2015/0117738 A1* | 4/2015 | Braun | G16H 40/63 382/131 |
| 2015/0201895 A1 | 7/2015 | Suzuki | |
| 2016/0120493 A1* | 5/2016 | Maeda | A61B 6/032 382/131 |
| 2018/0018757 A1* | 1/2018 | Suzuki | G06T 3/4046 |
| 2018/0197317 A1* | 7/2018 | Cheng | G06T 11/008 |
| 2018/0204356 A1* | 7/2018 | Xia | G06T 11/005 |
| 2019/0325621 A1* | 10/2019 | Wang | A61B 6/032 |

OTHER PUBLICATIONS

Written Opinion of the International Searching Authority for PCT/CN2017/095071 dated Apr. 18, 2018, 4 pages.

* cited by examiner

SYSTEM AND METHOD FOR IMAGE CONVERSION

CROSS-REFERENCE TO RELATED APPLICATIONS

This present application is a continuation of International Application No. PCT/CN2017/095071, filed on Jul. 28, 2017, the contents of which are hereby incorporated by reference

TECHNICAL FIELD

The present disclosure generally relates to an imaging system, and more specifically relates to methods and systems for converting a low-dose image to a high-dose image.

BACKGROUND

Computed tomography (CT) is a technology that makes use of computer-processed combinations of X-ray data taken from different angles to produce 2D or 3D images. The CT technology has been widely used in medical diagnosis. During a reconstruction process of a CT image based on low-dose projection data, noise and/or artifacts (e.g., staircase artifacts) may appear in a reconstructed CT image. The artifacts may reduce the image quality and influence the results of diagnosis on the basis of such an image. A high-dose CT scan may at least partially alleviate these problems but at the cost of exposing a scanned object too more radiation. It is desirable to provide systems and methods for generating a high-dose CT image of improved quality, based on a low-dose CT scan.

SUMMARY

According to an aspect of the present disclosure, a method for converting a low-dose image to a high-dose image is provided. The method may be implemented on at least one machine each of which has at least one processor and storage. The method may include obtaining a first set of projection data with respect to a first dose level; reconstructing, based on the first set of projection data, a first image; determining, based on the first set of projection data, a second set of projection data, the second set of projection data relating to a second dose level that is lower than the first dose level; reconstructing, based on the second set of projection data, a second image; and training a first neural network model based on the first image and the second image, the trained first neural network model being configured to convert a third image to a fourth image, the fourth image exhibiting a lower noise level and corresponding to a higher dose level than the third image.

In some embodiments, the first neural network model may be structured based on at least one of a Convolutional Neural Network (CNN), a Recurrent Neural Network (RNN), a Long Short-Term Memory (LSTM), or a Generative Adversarial Network (GAN).

In some embodiments, the first image may be reconstructed based on an iterative reconstruction algorithm with first reconstruction parameters.

In some embodiments, the second image may be reconstructed based on an analytical reconstruction algorithm, or an iterative reconstruction algorithm with second reconstruction parameters. In some embodiments, the second reconstruction parameters may be, at least partially, different from the first parameters.

In some embodiments, the first image may be reconstructed by applying at least one of a larger slice thickness, a larger reconstruction matrix, or a smaller FOV, compared to the reconstruction of the second image.

In some embodiments, the second set of projection data is determined based on at least one of a scanning parameter of a scanner that acquires the first projection data, an attenuation coefficient relating to a subject, and noises corresponding to the scanner, a response of a tube, a response of a detector of the scanner, a size of a focus of the scanner, a flying focus of the scanner, an integration time of the detector of the scanner, or a scattering coefficient of the subject.

In some embodiments, the determining the second set of projection data may include determining a first distribution of a radiation with respect to the second dose level before the radiation passing through a subject; determining a second distribution of the radiation after the radiation passing through the subject based on the first distribution of the radiation and the first set of projection data; determining a noise estimation of the scanner; and determining the second set of projection data, based on the second distribution of the radiation and the noise estimation. In some embodiments, the determining the noise estimation may include detecting a response of detectors in the scanner when no radiation is emitted from the scanner.

In some embodiments, the training the first neural network model based on the first image and the second image may include extracting, from the first image, a first region; extracting, from the second image, a second sub-region corresponding to the first region in the first image, the first region in the first image having a same size as the second region; and training the first neural network model based on the first region in the first image and the second region in the second image.

In some embodiments, the training the first neural network model based on the first region in the first image and the second region in the second image may include initializing parameter values of the first neural network model; iteratively determining, at least based on the first region in the first image and the second region in the second image, a value of a cost function relating to the parameter values of the first neural network model in each iteration, including updating at least some of the parameter values of the first neural network model after each iteration based on an updated value of the cost function obtained in a most recent iteration; and determining the trained first neural network model until a condition is satisfied.

In some embodiments, the condition may include that a variation of the values of the cost function among a plurality of iterations is below a threshold, or a threshold number of the iterations have been performed.

In some embodiments, the method may further include training a second neural network model based on a sixth image and a seventh image. In some embodiments, the sixth image and the seventh image may be reconstructed based on the third set of projection data. In some embodiments, an image quality of the seventh image may be greater than that of the sixth image. The image quality may relate to at least one of a contrast ratio and a spatial ratio.

In some embodiments, the third set of projection data may include the first set of projection data.

In some embodiments, a dimension of the first image or the first neural network model is no less than two.

According to another aspect of the present disclosure, a method for converting a low-dose image to a high-dose image is provided. The method may be implemented on at least one machine each of which has at least one processor and storage. The method may include obtaining a first set of projection data with respect to a first dose level; determining, based on a first neural network model and the first set of projection data, a second set of projection data with respect to a second dose level that is higher than the first dose level; generating, based on the second set of projection data, a first image; generating, based on a second neural network model and the first image, a second image.

In some embodiments, the first neural network model may be generated by obtaining a third set of projection data with respect to a third dose level; simulating, based on the third set of projection data, a fourth set of projection data, the fourth set of projection data relating to a fourth dose level that is lower than the third dose level; and training the first neural network model based on the third set of projection data and the fourth set of projection data.

In some embodiments, the simulating the fourth set of projection data may include determining a first distribution of a radiation with respect to the fourth dose level before the radiation passing through a subject; determining, based on the first distribution of the radiation and the third set of projection data, a second distribution of the radiation after the radiation passing through the subject; determining a noise estimation of a scanner; an determining, based on the second distribution of the radiation and the noise estimation, the fourth set of projection data.

In some embodiments, the second neural network may be generated by obtaining a third image, the third image being reconstructed based on a fifth set of projection data, and obtaining a fourth image, the fourth image being reconstructed based on the fifth set of projection data; training the second neural network model based on the third image and the fourth image. In some embodiments, an image quality of the fourth image may be greater than that of the third image, the image quality relating to at least one of a contrast ratio and a spatial resolution.

In some embodiments, the fifth set of projection data may include the first set of projection data.

In some embodiments, a dimension of the first image or the first neural network model may be no less than two.

In some embodiments, the first dose level may be 5 mSv or above.

In some embodiments, the first dose level may be 15 mSv or above.

In some embodiments, the second dose level may be 10% or below of the first dose level.

In some embodiments, the second dose level may be 40% or below of the first dose level.

According to an aspect of the present disclosure, a system for converting a low-dose image to a high-dose image is provided. The system may include at least one processor and executable instructions. When the executable instructions are executed by the at least one processor, the instructions may cause the at least one processor to implement a method. The method may include obtaining a first set of projection data with respect to a first dose level; reconstructing, based on the first set of projection data, a first image; determining, based on the first set of projection data, a second set of projection data, the second set of projection data relating to a second dose level that is lower than the first dose level; reconstructing, based on the second set of projection data, a second image; and training a first neural network model based on the first image and the second image, the trained first neural network model being configured to convert a third image to a fourth image, the fourth image exhibiting a lower noise level and corresponding to a higher dose level than the third image.

According to another aspect of the present disclosure, a non-transitory computer readable medium is provided. The non-transitory computer readable medium may include executable instructions. When the instructions are executed by at least one processor, the instructions may cause the at least one processor to implement a method. The method may include obtaining a first set of projection data with respect to a first dose level; reconstructing, based on the first set of projection data, a first image; determining, based on the first set of projection data, a second set of projection data, the second set of projection data relating to a second dose level that is lower than the first dose level; reconstructing, based on the second set of projection data, a second image; and training a first neural network model based on the first image and the second image, the trained first neural network model being configured to convert a third image to a fourth image, the fourth image exhibiting a lower noise level and corresponding to a higher dose level than the third image.

According to an aspect of the present disclosure, a system for converting a low-dose image to a high-dose image is provided. The system may include an image data simulation unit. The image data simulation unit may be configured to determine, based on a first set of projection data, a second set of projection data, wherein the first set of projection data may relate to a first dose level, and the second set of projection data may relate to a second dose level that is lower than the first dose level. The system may further include an image reconstruction unit that is configured to reconstruct a first image based on the first set of projection data and reconstruct a second image based on the second set of projection data. The system may further include a neural network training unit that is configured to train a first neural network model based on the first image and the second image, the trained first neural network model being configured to convert a third image to a fourth image, the fourth image exhibiting a lower noise level and corresponding to a higher dose level than the third image.

According to an aspect of the present disclosure, a system for converting a low-dose image to a high-dose image is provided. The system may include at least one processor and executable instructions. When the executable instructions are executed by the at least one processor, the instructions may cause the at least one processor to implement a method. The method may include obtaining a first set of projection data with respect to a first dose level; determining, based on a first neural network model and the first set of projection data, a second set of projection data with respect to a second dose level that is higher than the first dose level; generating, based on the second set of projection data, a first image; generating, based on a second neural network model and the first image, a second image.

According to another aspect of the present disclosure, a non-transitory computer readable medium is provided. The non-transitory computer readable medium may include executable instructions. When the instructions are executed by at least one processor, the instructions may cause the at least one processor to implement a method. The method may include obtaining a first set of projection data with respect to a first dose level; determining, based on a first neural network model and the first set of projection data, a second set of projection data with respect to a second dose level that is higher than the first dose level; generating, based on the second set of projection data, a first image; generating, based on a second neural network model and the first image, a second image.

According to an aspect of the present disclosure, a system for converting a low-dose image to a high-dose image is provided. The system may include an acquisition module. The acquisition module may be configured to obtain a first set of projection data with respect to a first dose level. The system may further include an image data processing module. The image data processing module may be configured to determine, based on a first neural network model and the first set of projection data, a second set of projection data with respect to a second dose level that is higher than the first dose level; generate, based on the second set of projection data, a first image; and generate, based on a second neural network model and the first image, a second image.

According to another aspect of the present disclosure, a method for training a neural network is provided. The method may be implemented on at least one machine each of which has at least one processor and storage. The method may include obtaining a first set of projection data with respect to a first dose level; determining, based on the first set of projection data, a second set of projection data, the second set of projection data relating to a second dose level that is lower than the first dose level; and training a neural network model based on the first set of projection data and the second set of projection data, the trained neural network model being configured to convert a third set of projection data to a fourth set of projection data, the fourth set of projection data having a lower noise level than the third set of projection data.

According to another aspect of the present disclosure, a method for training a neural network is provided. The method may be implemented on at least one machine each of which has at least one processor and storage. The method may include obtaining projection data with respect to a dose level; reconstructing, based on the projection data, a first image by a first reconstruction parameter; reconstructing, based on the projection data, a second image by a second reconstruction parameter, the second reconstruction parameter being different from the first reconstruction parameter; and training a neural network model based on the first image and the second image, the neural network model being configured to convert a third image to a fourth image, wherein the fourth image exhibits greater image quality than the third image, the image quality relating to at least one of a contrast ratio and a spatial resolution.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "engine," "unit," "module," and/or "block" used herein are one method to distinguish different components, elements, parts, section or assembly of different level in ascending order. However, the terms may be displaced by other expression if they achieve the same purpose.

Figure 2:
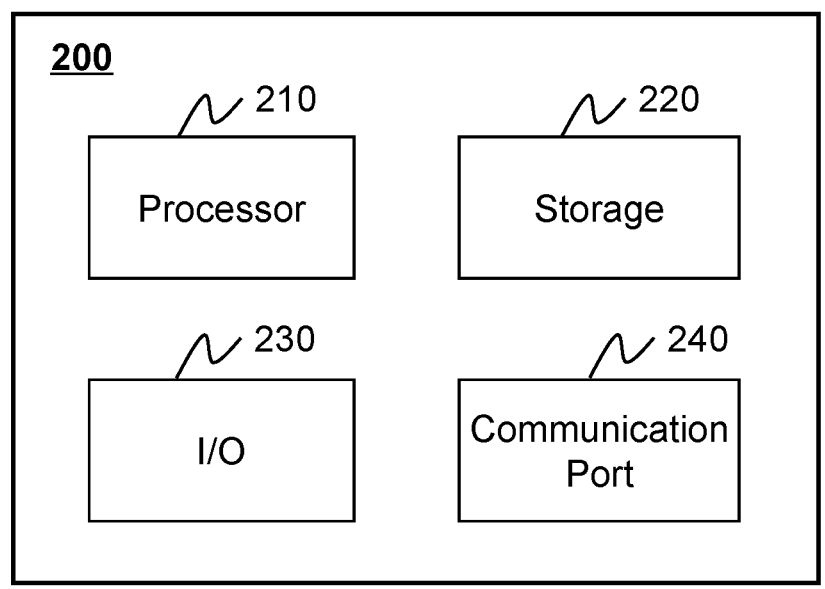
FIG. 2 is a schematic diagram illustrating exemplary hardware and/or software components of an exemplary computing device according to some embodiments of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

Provided herein are systems and components for image processing. In some embodiments, the imaging system may include a single-modality imaging system, such as a computed tomography (CT) system, an emission computed tomography (ECT) system, an ultrasonography system, an X-ray photography system, a positron emission tomography (PET) system, or the like, or any combination thereof. In some embodiments, the imaging systrem may incude a multi-modality imaging system, such as, a computed tomography-magnetic resonance imaging (CT-MRI) system, a positron emission tomography-magnetic resonance imaging (PET-MRI) system, a single photon emission computed tomography-computed tomography (SPECT-CT) system, a digital subtraction angiography-computed tomography (DSA-CT) system, etc. It should be noted that the CT imaging system 100 described below is merely provided for illustration purposes, and not intended to limit the scope of the present disclosure.

For illustration purposes, the disclosure describes systems and methods for CT image processing. The system may generate a CT image based on a neural network model. For example, low-dose CT image data may be processed based on a neural network model to generate high-dose CT image data. The high-dose CT image data may exhibit a higher quality than the low-dose CT image data. The neural network model may be obtained from a training based on multiple low-dose images or image data, as well as high-doses images reconstructed based on different reconstruction techniques, respectively.

The following description is provided to help better understanding CT image reconstruction methods and/or systems. This is not intended to limit the scope the present disclosure. For persons having ordinary skills in the art, a certain amount of variations, changes, and/or modifications may be deducted under the guidance of the present disclosure. Those variations, changes, and/or modifications do not depart from the scope of the present disclosure.

Figure 1:
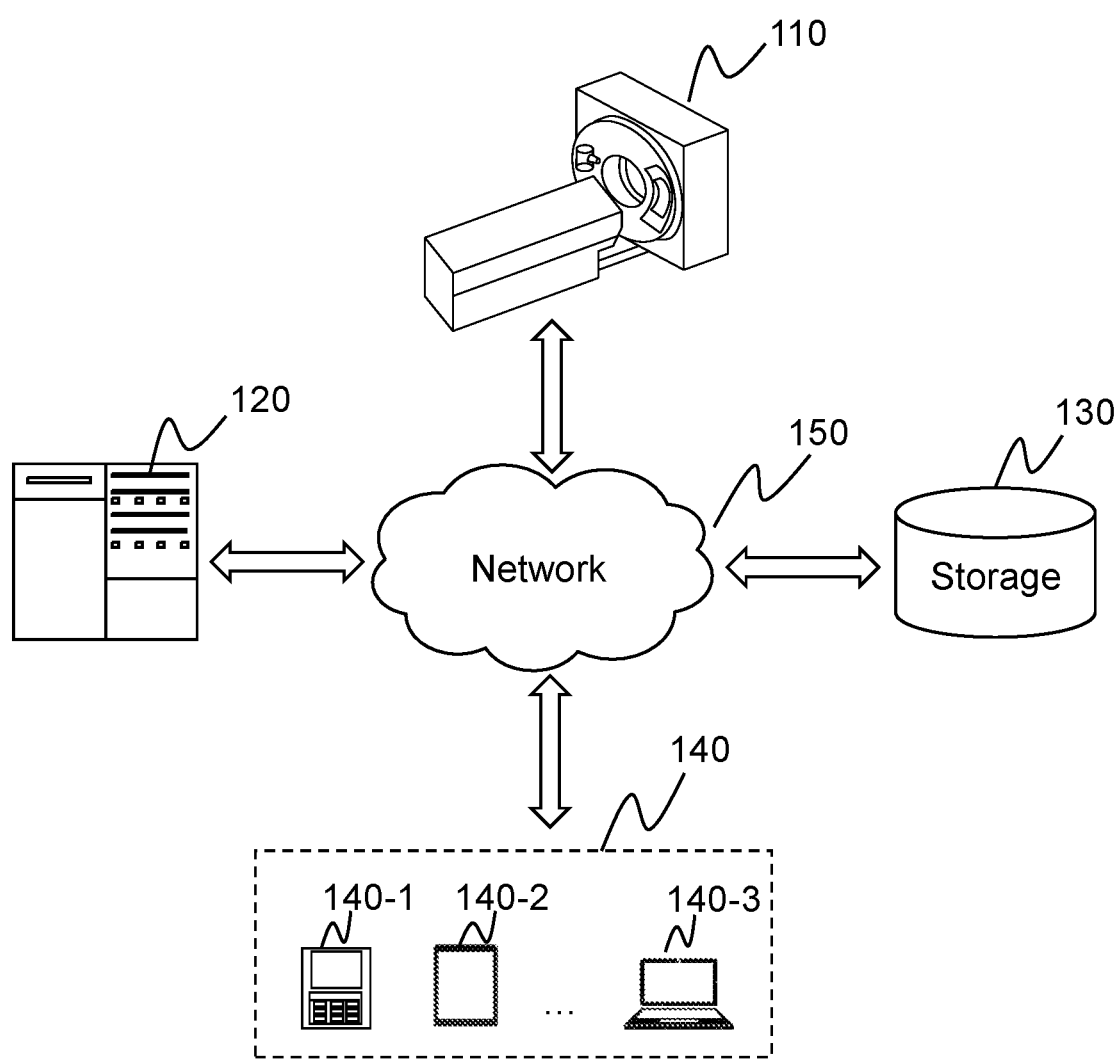
FIG. 1 is a schematic diagram illustrating an exemplary CT imaging system according to some embodiments of the present disclosure.

FIG. 1 is schematic diagrams illustrating an exemplary CT imaging system 100 according to some embodiments of the present disclosure. As shown, the CT imaging system 100 may include a scanner 110, a processing engine 120, a storage 130, one or more terminals 140, and a network 150. In some embodiments, the scanner 110, the processing engine 120, the storage 130, and/or the terminal(s) 140 may be connected to and/or communicate with each other via a wireless connection (e.g., the network 150), a wired connection, or a combination thereof. The connection between the components in the CT imaging system 100 may be variable. Merely by way of example, the scanner 110 may be connected to the processing engine 120 through the network 150, as illustrated in FIG. 1. As another example, the scanner 110 may be connected to the processing engine 120 directly. As a further example, the storage 130 may be connected to the processing engine 120 through the network 150, as illustrated in FIG. 1, or connected to the processing engine 120 directly. As still a further example, a terminal 140 may be connected to the processing engine 120 through the network 150, as illustrated in FIG. 1, or connected to the processing engine 120 directly.

The scanner 110 may generate or provide image data via scanning a subject, or a part of the subject. In some embodiments, the scanner 110 may include a single-modality scanner and/or multi-modality scanner. The single-modality may include, for example, a computed tomography (CT) scanner, a positron emission tomography (PET) scanner, etc. The multi-modality scanner may include a single photon emission computed tomography-computed tomography (SPECT-CT) scanner, a positron emission tomography-computed tomography (CT-PET) scanner, a computed tomography-ultra-sonic (CT-US) scanner, a digital subtraction angiography-computed tomography (DSA-CT) scanner, or the like, or a combination thereof. In some embodiments, the image data may include projection data, images relating to the subject, etc. The projection data may be raw data generated by the scanner 110 by scanning the subject, or data generated by a forward projection on an image relating to the subject. In some embodiments, the subject may include a body, a substance, an object, or the like, or a combination thereof. In some embodiments, the subject may include a specific portion of a body, such as a head, a thorax, an abdomen, or the like, or a combination thereof. In some embodiments, the subject may include a specific organ or region of interest, such as an esophagus, a trachea, a bronchus, a stomach, a gallbladder, a small intestine, a colon, a bladder, a ureter, a uterus, a fallopian tube, etc.

In some embodiments, the scanner 110 may include a tube, a detector, etc. The tube may generate and/or emit one or more radiation beams travelling toward the subject according to one or more scanning parameters. The radiation may include a particle ray, a photon ray, or the like, or a combination thereof. In some embodiments, the radiation may include a plurality of radiation particles (e.g., neutrons, protons, electron, p-mesons, heavy ions, etc.), a plurality of radiation photons (e.g., X-ray, a y-ray, ultraviolet, laser, etc.), or the like, or a combination thereof. Exemplary scanning parameters may include a tube current/voltage, an integration time of a detector, a focus size of a tube, a response of a detector, a response of a tube, a width of a collimation, a slice thickness, a slice gap, a field of view (FOV), etc. In some embodiments, the scanning parameters may relate to a dose level of the radiation emitted from the tube. As used herein, the dose level of the radiation may be defined by a CT dose index (CTDI), an effective dose, a dose-length product, etc. The CT dose index (CTDI) may refer to the radiation energy of radiation corresponding to a single slice along a long axis (e.g., the axial direction) of the scanner 110. The dose-length product may refer to the total radiation energy of radiation received by a subject being examined in an integrated scanning procedure. The effective dose may refer to radiation energy of radiation received by a specific region of a subject in an integrated scanning procedure.

The detector in the scanner 110 may detect one or more radiation beams emitted from the tube. In some embodiments, the detector of the scanner 110 may include one or more detector units that may detect a distribution of the radiation beams emitted from the tube. In some embodiments, the detector of the scanner 110 may be connected to a data conversation circuit configured to convert the distribution of the detected radiation beams into image data (e.g., projection data). The image data may correspond to the dose level of a detected radiation beams. In some embodiments, the dose level of the detected radiation beams may include noise represented in the image data. For example, the higher the dose level of radiation is, the lower the noise level relative to true signal (reflecting actual anatomy) represented in the image data may be. The lower the dose-level of radiation is, the higher the noise level represented in the image data may be.

The processing engine 120 may process data and/or information obtained from the scanner 110, the storage 130, and/or the terminal(s) 140. For example, the processing engine 120 may reconstruct an image based on projection data generated by the scanner 110. As another example, the processing engine 120 may determine one or more neural network models configured to process and/or convert an image. In some embodiments, the processing engine 120 may be a single server or a server group. The server group may be centralized or distributed. In some embodiments, the processing engine 120 may be local or remote. For example, the processing engine 120 may access information and/or data from the scanner 110, the storage 130, and/or the terminal(s) 140 via the network 150. As another example, the processing engine 120 may be directly connected to the scanner 110, the terminal(s) 140, and/or the storage 130 to access information and/or data. In some embodiments, the processing engine 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing engine 120 may be implemented by a computing device 200 having one or more components as described in connection with FIG. 2.

The storage 130 may store data, instructions, and/or any other information. In some embodiments, the storage 130 may store data obtained from the processing engine 120, the terminal(s) 140, and/or the interaction device 150. In some embodiments, the storage 130 may store data and/or instructions that the processing engine 120 may execute or use to perform exemplary methods described in the present disclosure. In some embodiments, the storage 130 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 130 may be implemented on a cloud platform as described elsewhere in the disclosure.

In some embodiments, the storage 130 may be connected to the network 150 to communicate with one or more other components in the CT imaging system 100 (e.g., the processing engine 120, the terminal(s) 140, etc.). One or more components in the CT imaging system 100 may access the data or instructions stored in the storage 130 via the network 150. In some embodiments, the storage 130 may be part of the processing engine 120.

The terminal(s) 140 may be connected to and/or communicate with the scanner 110, the processing engine 120, and/or the storage 130. For example, the terminal(s) 140 may obtain a processed image from the processing engine 120. As another example, the terminal(s) 140 may obtain image data acquired via the scanner 110 and transmit the image data to the processing engine 120 to be processed. In some embodiments, the terminal(s) 140 may include a mobile device 140-1, a tablet computer 140-2, a laptop computer 140-3, or the like, or any combination thereof. For example, the mobile device 140-1 may include a mobile phone, a personal digital assistance (PDA), a gaming device, a navigation device, a point of sale (POS) device, a laptop, a tablet computer, a desktop, or the like, or any combination thereof. In some embodiments, the terminal(s) 140 may include an input device, an output device, etc. The input device may include alphanumeric and other keys that may be input via a keyboard, a touch screen (for example, with haptics or tactile feedback), a speech input, an eye tracking input, a brain monitoring system, or any other comparable input mechanism. The input information received through the input device may be transmitted to the processing engine 120 via, for example, a bus, for further processing. Other types of the input device may include a cursor control device, such as a mouse, a trackball, or cursor direction keys, etc. The output device may include a display, a speaker, a printer, or the like, or a combination thereof. In some embodiments, the terminal(s) 140 may be part of the processing engine 120.

The network 150 may include any suitable network that can facilitate exchange of information and/or data for the CT imaging system 100. In some embodiments, one or more components of the CT imaging system 100 (e.g., the scanner 110, the processing engine 120, the storage 130, the terminal(s) 140, etc.) may communicate information and/or data with one or more other components of the CT imaging system 100 via the network 150. For example, the processing engine 120 may obtain image data from the scanner 110 via the network 150. As another example, the processing engine 120 may obtain user instruction(s) from the terminal(s) 140 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a Long Term Evolution (LTE) network), a frame relay network, a virtual private network (VPN), a satellite network, a telephone network, routers, hubs, switches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the CT imaging system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage 130 may be a data storage including cloud computing platforms, such as, public cloud, private cloud, community, and hybrid clouds, etc. However, those variations and modifications do not depart the scope of the present disclosure.

FIG. 2 is a schematic diagram illustrating exemplary hardware and/or software components of an exemplary computing device 200 on which the processing engine 120 may be implemented according to some embodiments of the present disclosure. As illustrated in FIG. 2-A, the computing device 200 may include a processor 210, a storage 220, an input/output (I/O) 230, and a communication port 240.

The processor 210 may execute computer instructions (e.g., program code) and perform functions of the processing engine 120 in accordance with techniques described herein. The computer instructions may include, for example, routines, programs, objects, components, data structures, procedures, modules, and functions, which perform particular functions described herein. For example, the processor 210 may process image data obtained from the CT scanner 110, the terminals 140, the storage 130, and/or any other component of the CT imaging system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combinations thereof.

Merely for illustration, only one processor is described in the computing device 200. However, it should be noted that the computing device 200 in the present disclosure may also include multiple processors, thus operations and/or method operations that are performed by one processor as described in the present disclosure may also be jointly or separately performed by the multiple processors. For example, if in the present disclosure the processor of the computing device 200 executes both operation A and operation B, it should be understood that operation A and operation B may also be performed by two or more different processors jointly or separately in the computing device 200 (e.g., a first processor executes operation A and a second processor executes operation B, or the first and second processors jointly execute operation s A and B).

The storage 220 may store data/information obtained from the CT scanner 110, the terminals 140, the storage 130, and/or any other component of the CT imaging system 100. In some embodiments, the storage 220 may include a mass storage, a removable storage, a volatile read-and-write memory, a read-only memory (ROM), or the like, or any combination thereof. For example, the mass storage may include a magnetic disk, an optical disk, a solid-state drives, etc. The removable storage may include a flash drive, a floppy disk, an optical disk, a memory card, a zip disk, a magnetic tape, etc. The volatile read-and-write memory may include a random access memory (RAM). The RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. The ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage 220 may store one or more programs and/or instructions to perform exemplary methods described in the present disclosure. For example, the storage 220 may store a program for the processing engine 120 for determining a regularization item.

The I/O 230 may input and/or output signals, data, information, etc. In some embodiments, the I/O 230 may enable a user interaction with the processing engine 120. In some embodiments, the I/O 230 may include an input device and an output device. Examples of the input device may include a keyboard, a mouse, a touch screen, a microphone, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touch screen, or the like, or a combination thereof.

The communication port 240 may be connected to a network (e.g., the network 150) to facilitate data communications. The communication port 240 may establish connections between the processing engine 120 and the CT scanner 110, the terminals 140, and/or the storage 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G, etc.), or the like, or a combination thereof. In some embodiments, the communication port 240 may be and/or include a standardized communication port, such as RS232, RS485, etc. In some embodiments, the communication port 240 may be a specially designed communication port. For example, the communication port 240 may be designed in accordance with the digital imaging and communications in medicine (DICOM) protocol.

Figure 3:
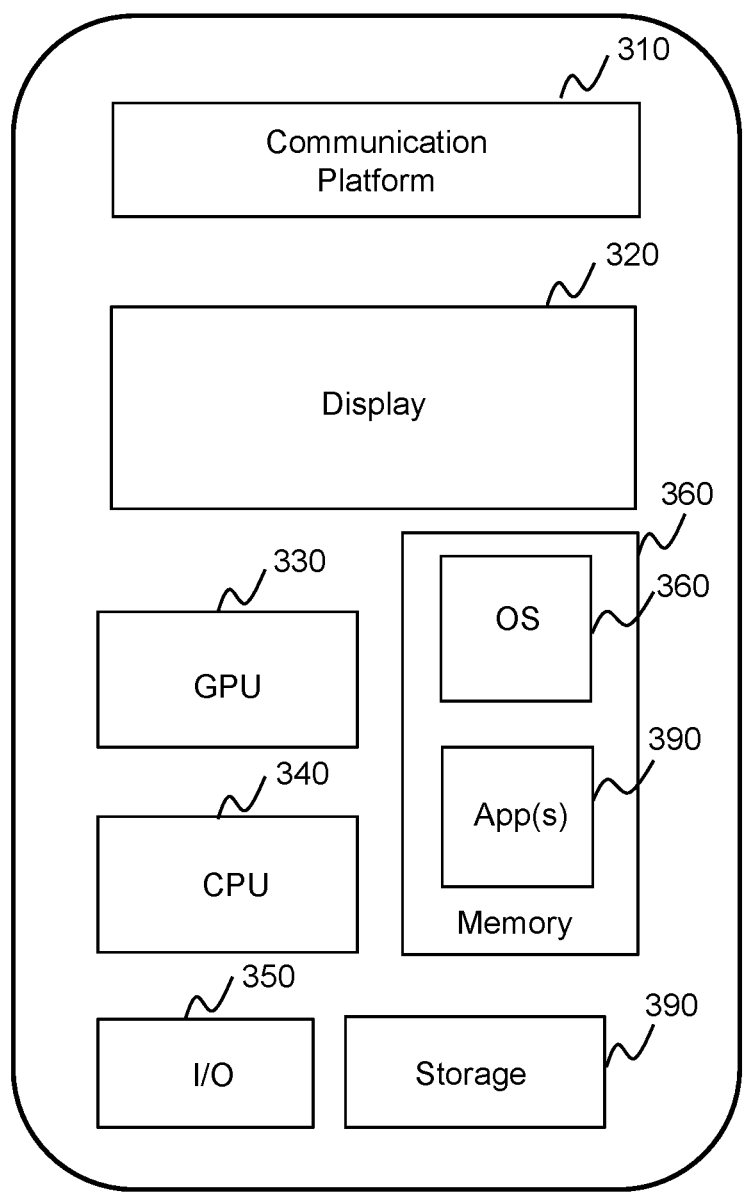
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device 300 on which the terminals 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to image processing or other information from the processing engine 120. User interactions with the information stream may be achieved via the I/O 350 and provided to the processing engine 120 and/or other components of the CT imaging system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
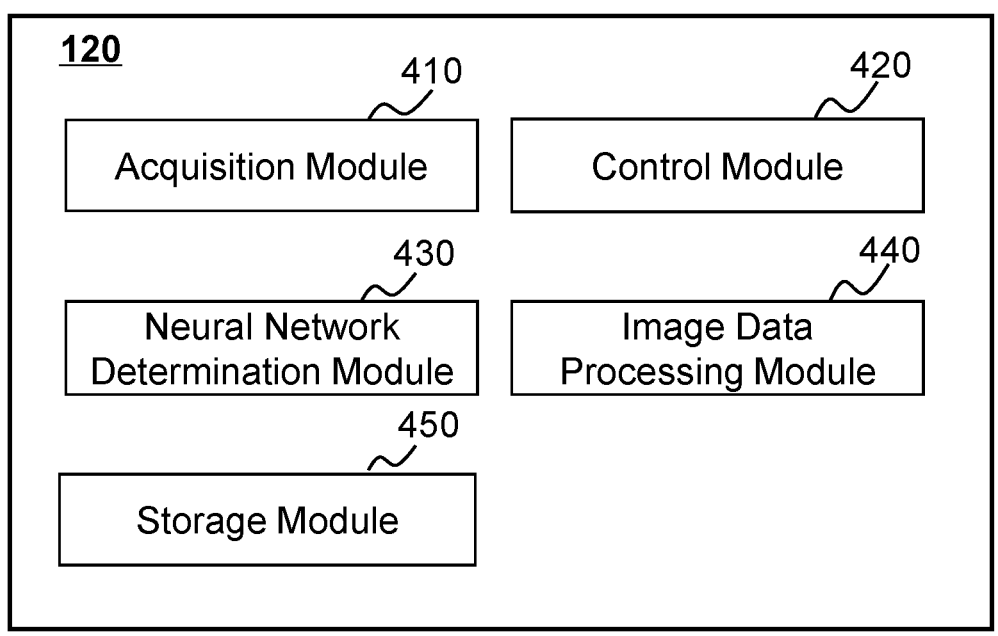
FIG. 4 is a block diagram illustrating an exemplary processing engine according to some embodiments of the present disclosure.

FIG. 4 is a block diagram illustrating an exemplary processing engine 120 according to some embodiments of the present disclosure. The processing engine 120 may include an acquisition module 410, a control module 420, a neural network determination module 430, an image data processing module 440, and a storage module 450. The processing engine 120 may be implemented on various components (e.g., the processor 210 of the computing device 200 as illustrated in FIG. 2). For example, at least a portion of the processing engine 120 may be implemented on a computing device as illustrated in FIG. 2 or a mobile device as illustrated in FIG. 3.

The acquisition module 410 may acquire image data. The acquisition module 410 may acquire the image data from the scanner 110, or a storage device (e.g., the storage 130, the storage 220, the storage 390, the memory 360, the storage module 450, or the like, or a combination thereof). The image data may include projection data, images, etc. In some embodiments, the acquisition module 410 may transmit the acquired image data to other modules or units of the processing engine 120 for further processing. For example, the acquired image data may be transmitted to the storage module 450 for storage. As another example, the acquisition module 410 may transmit the image data (e.g., projection data) to the image data processing module 440 to reconstruct an image.

The control module 420 may control operations of the acquisition module 410, the neural network determination module 430, the image processing module 440, and/or the storage module 450 (e.g., by generating one or more control parameters). For example, the control module 420 may control the acquisition module 410 to acquire image data. As another example, the control module 420 may control the image data processing module 440 to process the image data acquired by the acquisition module 410. As still another example, the control module 420 may control the neural network determination module 430 to train a neural network model. In some embodiments, the control module 420 may receive a real-time command or retrieve a predetermined command provided by, e.g., a user (e.g., a doctor) or the system 100 to control one or more operations of the acquisition module 410, the neural network determination module 430, and/or the image data processing module 440. For example, the control module 420 can adjust the image data processing module 440 to generate images of a subject according to the real-time command and/or the predetermined command. In some embodiments, the control module 420 may communicate with one or more other modules of the processing engine 120 for exchanging information and/or data.

The neural network determination module 430 may determine one or more neural network models. For example, the neural network determination module 430 may determine a first neural network model configured to, for example, reduce the noise level in an image. As another example, the neural network determination module 430 may determine a second neural network model configured to, for example, increase a contrast ratio of an image, by performing, for example, an image enhancement operation on the image. In some embodiments, the neural network determination module 430 may transmit a determined neural network model to one or more other modules for further processing or application. For example, the neural network determination module 430 may transmit a neural network model to the storage module 450 for storage. As another example, the neural network determination module 430 may transmit a neural network model to the image data processing module 440 for image processing.

The image data processing module 440 may process information provided by various modules of the processing engine 120. The processing module 440 may process image data acquired by the acquisition module 410, image data retrieved from the storage module 450, etc. In some embodiments, the image data processing module 440 may reconstruct an image based on the image data according to a reconstruction technique, generate a report including one or more images and/or other related information, and/or perform any other function for image reconstruction in accordance with various embodiments of the present disclosure.

The storage module 450 may store image data, models, control parameters, processed image data, or the like, or a combination thereof. In some embodiments, the storage module 450 may store one or more programs and/or instructions that may be executed by the processor(s) of the processing engine 120 to perform exemplary methods described in this disclosure. For example, the storage module 450 may store program(s) and/or instruction(s) that can be executed by the processor(s) of the processing engine 120 to acquire image data, reconstruct an image based on the image data, train a neural network model, and/or display any intermediate result or a resultant image.

In some embodiments, one or more modules illustrated in FIG. 4 may be implemented in at least part of the exemplary CT imaging system 100 as illustrated in FIG. 1. For example, the acquisition module 410, the control module 420, the storage module 450, the neural network determination module 430, and/or the image data processing module 440 may be integrated into a console (not shown). Via the console, a user may set parameters for scanning a subject, controlling imaging processes, controlling parameters for reconstruction of an image, viewing reconstructed images, etc. In some embodiments, the console may be implemented via the processing engine 120 and/or the terminals 140. In some embodiments, the neural network determination 430 may be integrated into the terminals 140.

In some embodiments, the processing engine 120 does not include the neural network determination module 430. One or more neural network models determined by another device may be stored in the system 100 (e.g., the storage 130, the storage 220, the storage 390, the memory 360, the storage module 450, etc.) or in an external device accessible by the processing engine 120 via, for example, the network 150. In some embodiments, such a device may include a portion the same as or similar to the neural network determination module 430. In some embodiments, the neural network determination module 430 may store one or more neural network models determined by another device and be accessible by one or more components of the system 100 (e.g., the image reconstruction unit 520, the image data simulation unit 540, etc.). In some embodiments, a neural network model applicable in the present disclosure may be determined by the system 100 (or a portion thereof including, e.g., the processing engine 120) or an external device accessible by the system 100 (or a portion thereof including, e.g., the processing engine 120) following the processes disclosure herein. See, for example, FIGS. 7, 9 and 10, and the description thereof.

Figure 5:
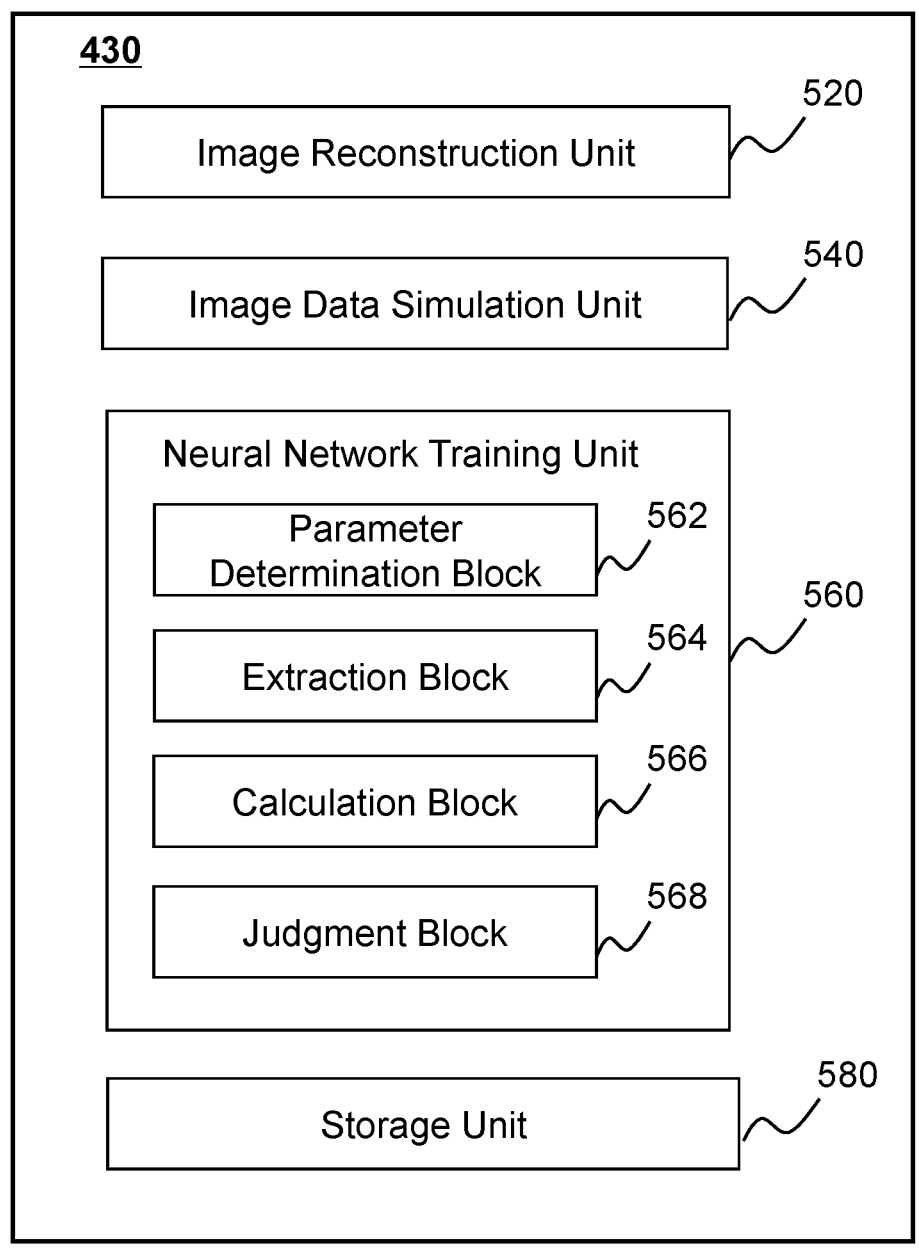
FIG. 5 is a block diagram illustrating an exemplary neural network determination module according to some embodiments of the present disclosure.

FIG. 5 is a block diagram illustrating an exemplary neural network determination module 430 according to some embodiments of the present disclosure. As shown, the neural network determination module 430 may include an image reconstruction unit 520, an image data simulation unit 540, a neural network training unit 560, and a storage unit 580. The neural network determination module 430 may be implemented on various components (e.g., the processor 210 of the computing device 200 as illustrated in FIG. 2). For example, at least a portion of the neural network determination module 430 may be implemented on a computing device as illustrated in FIG. 2 or a mobile device as illustrated in FIG. 3.

The image reconstruction unit 520 may reconstruct one or more images based on one or more reconstruction techniques. In some embodiments, the image reconstruction unit 520 may reconstruct a first image (e.g., a high-dose image) based on a first reconstruction technique. The image reconstruction unit 520 may reconstruct a second image (e.g., a low-dose image) based on a second reconstruction technique. The first reconstruction technique and the second reconstruction technique may be the same or different. In some embodiments, the image reconstruction unit 520 may transmit the reconstructed images to other units or blocks of the neural network determination module 430 for further processing. For example, the image reconstruction unit 520 may transmit the reconstructed images to the neural network training unit 560 for training a neural network model. As another example, the image reconstruction unit 520 may transmit the reconstructed images to the storage unit 580 for storage.

The image data simulation unit 540 may simulate image data. In some embodiments, the image data simulation unit 540 may simulate virtual low-dose image data based on high-dose image data acquired by way of a CT scan. As used herein, the virtual low-dose image data may correspond to a lower dose level than that of the true high-dose image data. In some embodiments, the image data simulation unit 540 may transmit the simulated image data to other units and/or blocks in the neural network determination module 430 for further processing. For example, the simulated image data may be transmitted to the image reconstruction unit 520 for generating an image. As another example, the simulated image data may be transmitted to the neural network training unit 560 for training a neural network model.

The neural network training unit 560 may train a neural network model. In some embodiments, the neural network training unit 560 may train a first neural network model configured to, for example, reduce the noise level in an image. Such a neural network model may be obtained using multiple high-dose images and corresponding low-dose images. In some embodiments, the neural network training unit 560 may train a second neural network model configured to, for example, improve a contrast ratio of an image. Such a neural network model may be obtained using multiple images with higher contrast ratios and corresponding images with lower contrast ratios. As used herein, two images may be considered corresponding to each other when both images relate to a same region of a subject. Merely by way of example, two corresponding images may be different in one or more aspects including, for example, a high-dose image vs. a low-dose image, an image having a high contrast ratio vs. an image having a low contrast ratio, or the like, or a combination thereof.

In some embodiments, the neural network training unit 560 may further include an initialization block 562, an extraction block 564, a calculation block 566, and a judgment block 568. The initialization block 562 may initialize a neural network model. For example, the initialization block 562 may construct an initial neural network model. As another example, the initialization block 562 may initialize one or more parameter values of the initial neural network model. The extraction block 564 may extract information from one or more training images (e.g., high-dose images and low-dose images). For example, the extraction block 564 may extract features regarding one or more regions from the training images. The calculation block 566 may perform a calculation function in a process for, for example, training a neural network model. For example, the calculation block 566 may calculate one or more parameter values of an updated neural network model generated in an iterative training process. The judgment block 568 may perform a judgment function in a process for, for example, training a neural network model. For example, the judgment block 568 may determine whether a condition satisfies in a training process of a neural network model.

The storage unit 580 may store information relating to, for example, training a neural network model. In some embodiments, the information relating to training a neural network model may include images for training a neural network model, algorithms for training a neural network model, parameters of a neural network model, etc. For example, the first storage unit 580 may store training images (e.g., high-dose images and low-dose images) according to a certain criterion. The training images may be stored or uploaded into the storage unit 580 based on dimensions of the training images. For illustration purposes, a two-dimensional (2D) image or a three-dimensional (3D) image may be stored as a 2D or 3D matrix including a plurality of elements (e.g., pixels or voxels). The elements of the 2D matrix may be arranged in the storage unit 580 in a manner that each row of elements, corresponding to the length of the 2D image, are orderly stored in the storage unit 580, and thus the elements in a same row may be adjacent to each other in the storage unit 580. The elements of the 3D matrix may be arranged in the storage unit 580 in a manner that multiple 2D matrixes that compose the 3D matrix may be orderly stored in the storage unit 580, and then the rows and/or the columns of each 2D matrix may be orderly stored in the storage unit 580. The storage unit 580 may be a memory that stores data to be processed by processing devices, such as CPUs, GPUs, etc. In some embodiments, the storage unit 580 may be a memory that may be accessible by one or more GPUs, or may be memory that is only accessible by a specific GPU.

It should be noted that the above description of the processing module 430 is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, the image reconstruction unit 520 and the image data simulation unit 540 may be integrated into one single unit.

Figure 6:
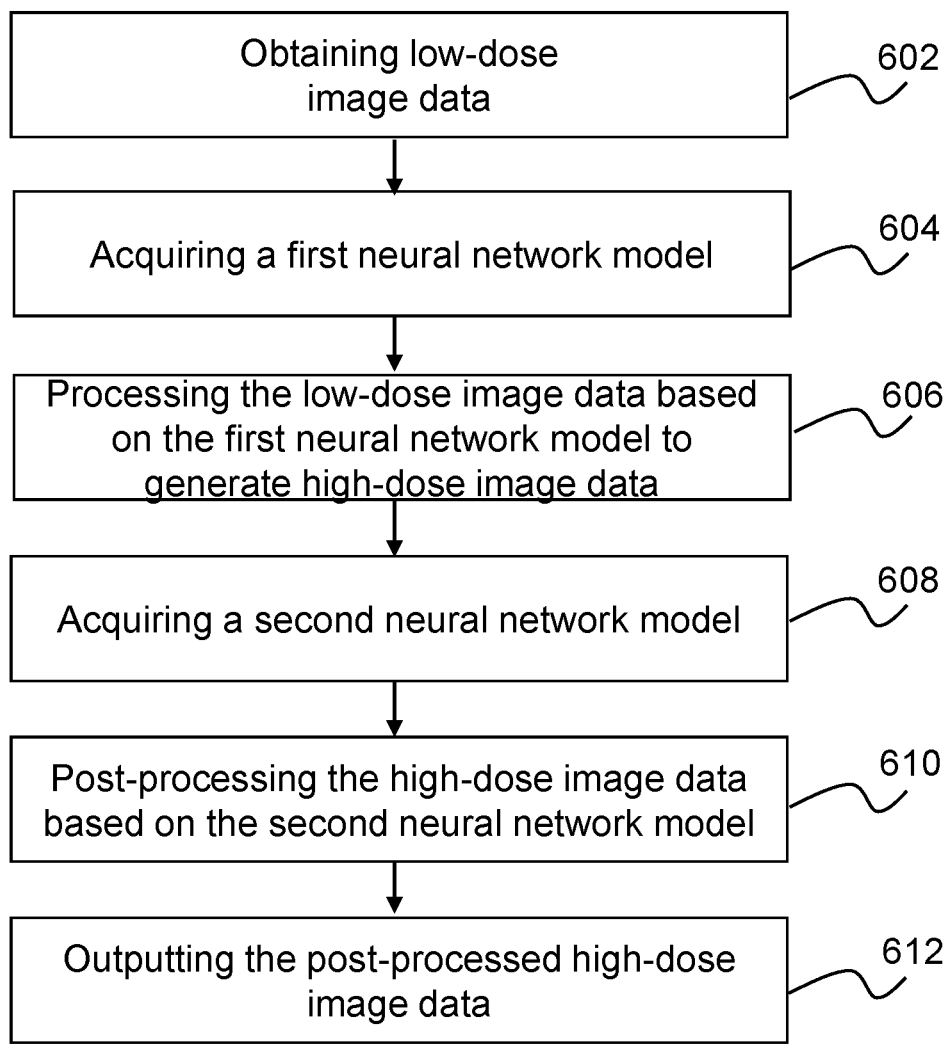
FIG. 6 is a flowchart illustrating an exemplary process for processing image data according to some embodiments of the present disclosure.

FIG. 6 is a flowchart illustrating an exemplary process 600 for processing image data according to some embodiments of the present disclosure. In some embodiments, one or more operations of process 600 illustrated in FIG. 6 for processing image data may be implemented in the CT imaging system 100 illustrated in FIG. 1. For example, the process 600 illustrated in FIG. 6 may be stored in the storage 130 in the form of instructions, and invoked and/or executed by the processing engine 120 (e.g., the processor 210 of the computing device 200 as illustrated in FIG. 2, the GPU 330 or CPU 340 of the mobile device 300 as illustrated in FIG. 3).

In 602, low-dose image data may be obtained. Operation 602 may be performed by the acquisition module 410. As used herein, the low-dose image data may refer to the image data (e.g., projection data, an image, etc.) corresponding to a first dose level. In some embodiments, the low-dose image data may include low-dose projection data. In some embodiments, the low-dose image data may include a low-dose image. In some embodiments, the low-dose image data may include two-dimensional (2D) image data, three-dimensional (3D) image data, four-dimensional (4D) image data, or image data of other dimensions. In some embodiments, the low-dose image data may be true image data obtained from a scanner (e.g., the scanner 110) generated by scanning a subject at a low-dose level (e.g., the first dose level). In some embodiments, the low-dose image data may be virtual image data that is obtained by way of simulation from other image data, e.g., high-dose image data. In some embodiments, the low-dose image data may be obtained from the storage 130, the terminal(s) 140, the storage module 450, and/or any other external storage device.

Figure 7:
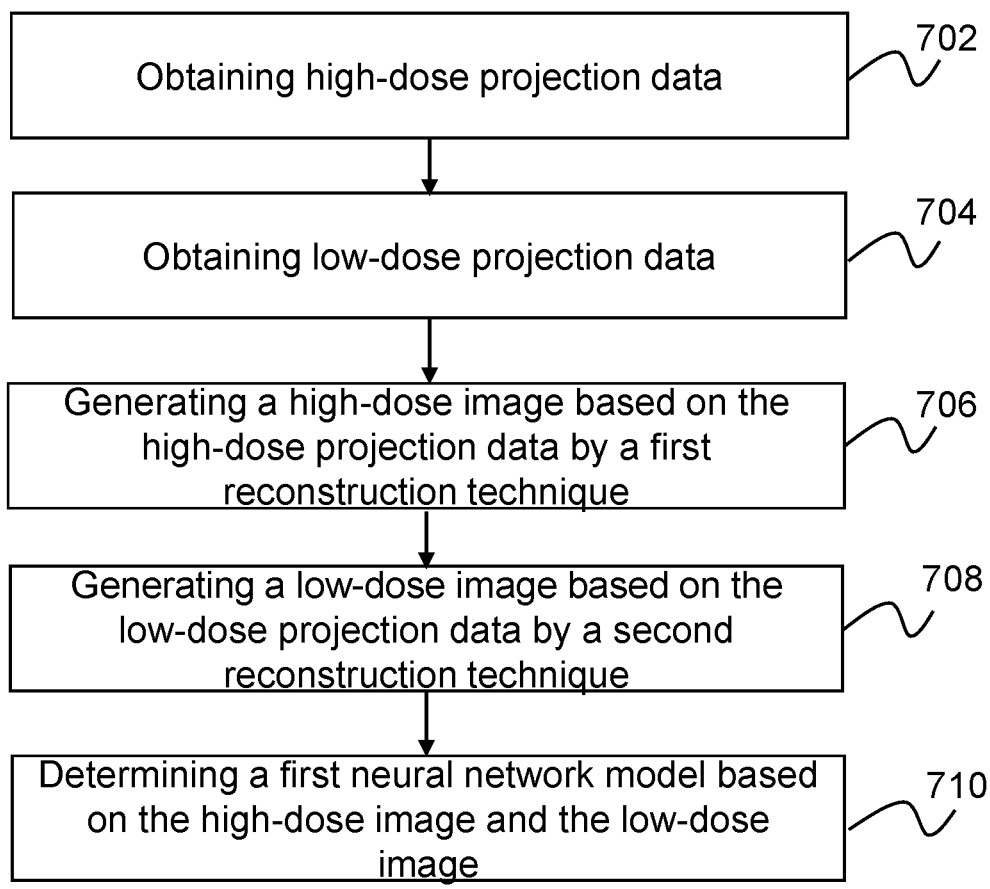
FIG. 7 is a flowchart illustrating an exemplary process for determining a first neural network model according to some embodiments of the present disclosure.

In 604, a first neural network model may be acquired. Operation 604 may be performed by the neural network determination module 430. In some embodiments, the first neural network model may be pre-determined (e.g., provided by a manufacturer of the CT scanner, an entity specializing in image processing, an entity having access to training data, etc.) In some embodiments, the first neural network model may be configured to process image data (e.g., the low-dose image data obtained in 602). Exemplary image data processing may include transform, modification, and/or conversion, etc. For example, the first neural network model may be configured to convert the low-dose image data to high-dose image data corresponding to the low-dose image data. As another example, the first neural network model may be configured to reduce the noise level in image data (e.g., the low-dose image data obtained in 602). In some embodiments, the first neural network model may be constructed based on a convolutional neural network (CNN), a recurrent neural network (RNN), a long short-term memory (LSTM), a generative adversarial network (GAN), or the like, or a combination thereof. See, for example, FIG. 11 and the description thereof. In some embodiments, the first neural network model may be constructed as a two-dimensional (2D) model, a three-dimensional (3D) model, a four-dimensional (4D) model, or a model of any other dimensions. In some embodiments, a first neural network model may be determined according to process 700 as illustrated in FIG. 7.

In 606, the low-dose image data may be processed based on the first neural network model to generate (virtual) high-dose image data corresponding to the low-dose image data. Operation 606 may be performed by the image data processing module 440. In some embodiments, the (virtual) high-dose image data corresponding the low-dose image data may exhibit a lower noise level than that of the low-dose image data. As used herein, the (virtual) high-dose image data corresponding to the low-dose image data may refer to the image data (e.g., projection data, an image, etc.) corresponding to a second dose level. The second dose level of the (virtual) high-dose image data may be greater than the first dose level of the low-dose image data. The corresponding (virtual) high-dose image data and low-dose image data may refer to the representation of a same subject or a same portion or region of the subject being examined (e.g., a patient, a tissue, etc.). In some embodiments, the (virtual) high-dose image data may include high-dose projection data. In some embodiments, the (virtual) high-dose image data may include a high-dose image. In some embodiments, the high-dose image data may include 2D image data, 3D image data, 4D image data, or image data of another dimension.

Figure 9:
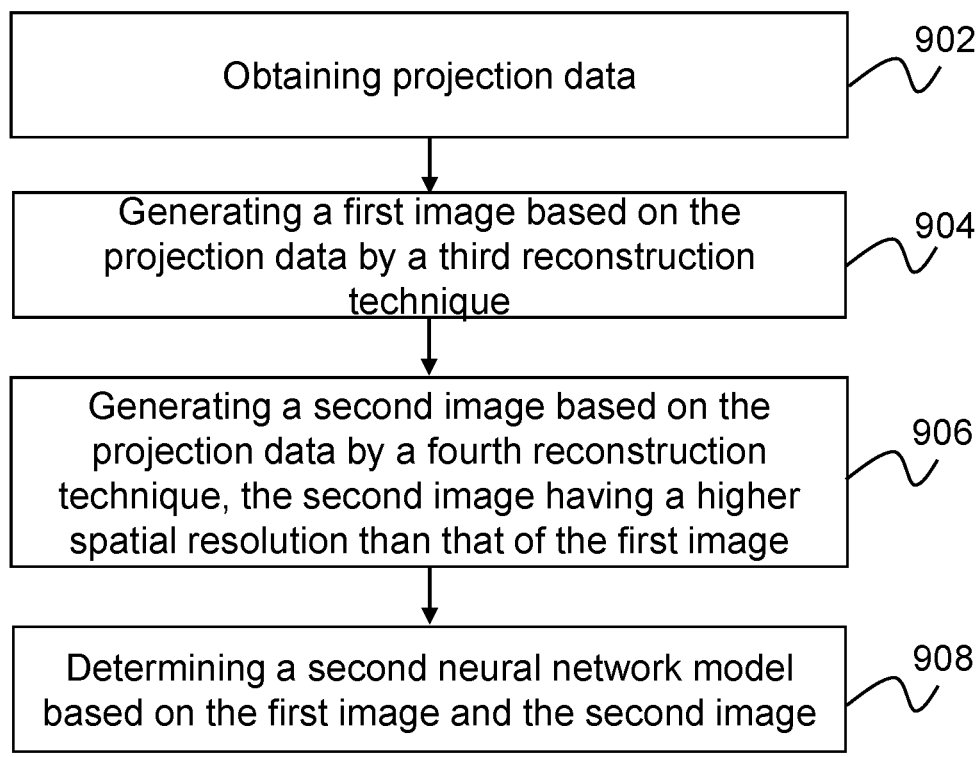
FIG. 9 is a flowchart illustrating an exemplary process for determining a second neural network model according to some embodiments of the present disclosure.

In 608, a second neural network model may be acquired. Operation 608 may be performed by the neural network model determination module 430. In some embodiments, the second neural network model may be pre-determined (e.g., provided by a manufacturer of the CT scanner, an entity specializing in image processing, an entity having access to training data, etc.) In some embodiments, the second neural network model may be configured to process image data (e.g., the (virtual) high-dose image data generated in 606). Exemplary image data processing may include transform, modification, and/or conversion, etc. For example, the second neural network model may be configured to perform an image data enhancement operation on the image data (e.g., the (virtual) high-dose image data generated in 606). In some embodiments, the second neural network model may be constructed based on a convolutional neural network (CNN), a recurrent neural network (RNN), a long short-term memory (LSTM), a generative adversarial network (GAN), or the like, or a combination thereof. See, for example, FIG. 11 and the description thereof. In some embodiments, the second neural network model may be constructed as a two-dimensional (2D) model, a three-dimensional (3D) model, a four-dimensional (4D) model, or a model of any other dimensions. In some embodiments, a second neural network model may be determined according to process 900 as illustrated in FIG. 9.

In 610, the (virtual) high-dose image data may be post-processed based on the second neural network model. Operation 610 may be performed by the image data processing module 440. In some embodiments, the post-processed high-dose image data may exhibit a higher quality than that of the high-dose image data acquired at 608. For example, the post-processed high-dose image data corresponding the high-dose image data may exhibit a higher contrast ratio than that of the high-dose image data acquired at 608.

In 612, the post-processed high-dose image data may be outputted. Operation 612 may be performed by image data processing module 440. In some embodiments, the post-processed high-dose image data may be outputted to the terminal(s) 140 for display in the form of, e.g., an image. In some embodiments, the post-processed high-dose image data may be outputted to the storage device 130 and/or the storage module 508 for storage.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, process 600 may include a pre-processing operation, such as denoising, the low-dose image data before operation 604. As another example, operations 606 and/or 608 may be unnecessary and omitted. In some embodiments, process 600 may further include outputting the high-dose image data generated in 606.

FIG. 7 is a flowchart illustrating an exemplary process 700 for determining a first neural network model according to some embodiments of the present disclosure. Operation 604 as illustrated in FIG. 6 may be performed according to process 700. In some embodiments, the first neural network model may be configured to convert low-dose image data to high-dose image data. The first neural network model may be determined by training a neural network model using multiple low-dose images and multiple corresponding high-dose images. A low-dose image and a corresponding high-dose image may be reconstructed based on different reconstruction techniques, respectively. In some embodiments, one or more operations of process 700 illustrated in FIG. 7 for determining a first neural network model may be implemented in the CT imaging system 100 illustrated in FIG. 1. For example, the process 700 illustrated in FIG. 7 may be stored in the storage 130 in the form of instructions, and invoked and/or executed by the processing engine 120 (e.g., the processor 210 of the computing device 200 as illustrated in FIG. 2, the GPU 330 or CPU 340 of the mobile device 300 as illustrated in FIG. 3).

In 702, high-dose projection data may be obtained. Operation 702 may be performed by the image data simulation unit 540. In some embodiments, the high-dose projection data may include 2D projection data, 3D projection data, etc. In some embodiments, the high-dose projection data may be obtained from a scanner (e.g., the scanner 110) generated by scanning a subject being examined. In some embodiments, the high-dose projection data may be generated by a forward projection of an image. In some embodiments, the high-dose projection data may be obtained from the storage 130, the terminals 140, the storage module 450, and/or any other external storage device.

In 704, low-dose projection data corresponding to the high-dose projection data may be obtained. Operation 704 may be performed by the image data simulation unit 540. As used herein, the corresponding low-dose projection data and high-dose projection data may refer to the representation of a same subject or the same portion(s) of the subject (e.g., a patient, a tissue, etc.). In some embodiments, the high-dose projection data may correspond to a first dose level, and the low-dose projection may correspond to a second dose level. The first dose level may be greater than the second dose level. In some embodiments, the first dose level and the second dose level may vary according to clinical demands (e.g., a type of a tissue). For example, in a liver scan, the first dose level may be equal to or exceed 5 mSv, or 10 mSv, or 15 mSv, etc. The second dose level may be lower than 15 mSv, or 10 mSv, or 5 mSv, etc. A ratio of the second dose level and the first dose level may range from 5% to 40%, such as 10%, 15%, 20%, 25%, 30%, etc. As another example, in a chest scan, the first dose level may be equal to or exceed 2 mSv, or 7 mSv, etc. The second dose level may be lower than 7 mSv, or 2 mSv, etc. In some embodiments, a ratio of the first dose level and an estimated effective dose may be equal to or exceed 1%, or 5%, or 10%, or 25%, or 50%, or 100%, or 150%, etc. A ratio of the second dose level and the estimated effective dose may be equal to or below 1%, or 5%, or 10%, or 25%, etc. The estimated effective dose may be of a dose level received in a region of interest for CT imaging in an integrated scanning schedule. The dose level of the estimated effective dose may range from, for example, 0.1 mSv to 1.5 mSv.

In some embodiments, the low-dose projection data may be obtained from a scanner (e.g., the scanner 110). In some embodiments, the low-dose projection data may be obtained from the storage 130, the terminals 140, the storage module 450 and/or any other external storage device. In some embodiments, the low-dose projection data may be determined based on the high-dose projection data. For example, the low-dose projection data may be determined by way of simulation based on the high-dose projection data.

It shall be noted that projection data may relate to a distribution of radiation emitted from a scanner (e.g., the scanner 110) after the radiation passes through a subject being examined. The projection data may include noise relating to the scanner (e.g., electronic noise of a detector in the scanner 110). The distribution of the radiation beam emitted from the scanner may relate to a scanning condition including one or more scanning parameters including, such as, for example, a tube current/voltage, an integration time of a detector, a focus size of a tube, a response of a detector, a response of a tube, a width of collimation, etc. Different scanning conditions may be configured to generate radiation beams of different dose levels. For example, the greater the tube current/voltage is, the higher dose level the generated radiation beams may be. In some embodiments, the low-dose projection data corresponding to the second dose level may be acquired based on the high-dose projection data corresponding to the first dose level as described in connection with FIG. 8. In some embodiments, both the high-dose projection data and the corresponding low-dose projection data may be obtained from a scanner (e.g., the scanner 110) generated by scanning a subject being examined.

In 706, a high-dose image may be generated based on the high-dose projection data by a first reconstruction technique. Operation 706 may be performed by the image reconstruction unit 520. In some embodiments, the first reconstruction technique may include an iterative reconstruction technique, an analytical reconstruction technique, or the like, or a combination thereof. Exemplary iterative reconstruction techniques may include an algebraic reconstruction technique (ART), a simultaneous iterative reconstruction technique (SIRT), a simultaneous algebraic reconstruction technique (SART), an adaptive statistical iterative reconstruction (ASIR) technique, a model based iterative reconstruction (MAIR) technique, a sinogram affirmed iterative reconstruction (SAFIR) technique, or the like, or a combination thereof. Exemplary analytical reconstruction techniques may include applying an FDK algorithm, a Katsevich algorithm, or the like, or a combination thereof. In some embodiments, before a reconstruction process of the high-dose image, one or more reconstruction parameters may be determined. Exemplary reconstruction parameters may include a field of view (FOV), a slice thickness, a reconstruction matrix, a slice gap, a convolution kernel, or the like, or a combination thereof. For example, the high-dose image may be reconstructed by applying a larger slice thickness, a larger reconstruction matrix, a smaller FOV, etc., compared to the reconstruction of a low-dose image.

In some embodiments, the high-dose image may exhibit a first image quality. As used herein, the first image quality may be defined by a first noise level of a high-dose or first image. In some embodiments, the first noise levels of high-dose images reconstructed based on the same image data but different reconstruction techniques may different. For example, the first noise level of a high-dose image reconstructed using an iterative reconstruction technique may be lower than that of a high-dose image reconstructed using an analytical reconstruction technique. In some embodiments, the first noise levels of high-dose images reconstructed based on the same image data and the same reconstruction technique but different reconstruction parameters may be different. For example, the first noise level of a high-dose image reconstructed using a larger slice thickness, a larger reconstruction matrix, a more smooth reconstruction kernel, and/or a smaller FOV, may be lower than that of a high-dose image reconstructed based on a same reconstruction technique using a smaller slice thickness, a smaller reconstruction matrix, a sharper reconstruction kernel and/or a larger FOV.

In some embodiments, in the reconstruction process of the high-dose image, a denosing technique or a filtering kernel function for performing an image smoothing function may be used to decrease the first noise level of a high-dose image. Exemplary denoising techniques may include an adaptive-filtering algorithm, a Karl-filtering algorithm, or the like, or a combination thereof. Exemplary adaptive-filtering algorithms may include a least mean squares (LMS) adaptive filtering algorithm, a recursive least squares (RLS) adaptive filtering algorithm, a transform domain adaptive filtering algorithm, an affine projection algorithm, a conjugate gradient algorithm, an adaptive filtering algorithm based on sub-band decomposition, an adaptive filtering algorithm based on QR decomposition, etc. In some embodiments, the denoising technique may include applying a denoising model. Exemplary denoising models may include a spatial-domain filter model, a transform-domain filter model, a morphological noise filter model, or the like, or a combination thereof. Exemplary spatial-domain filter models may include a field average filter model, a median filter model, a Gaussian filter model, or the like, or a combination thereof. Exemplary transform-domain filter models may include a Fourier transform model, a Walsh-Hadamard transform model, a cosine transform model, a K-L transform model, a wavelet transform model, or the like, or a combination thereof. In some embodiments, the denoising model may include a partial differential model or a variational model, such as a Perona-Malik (P-M) model, a total variation (TV) model, or the like, or a combination thereof. Exemplary filtering kernel techniques for performing an image smoothing function may include applying, for example, a linear smoothing filter (e.g., a block filter, a mean filter, a Gaussian filter, etc.,), a nonlinear smoothing filter (e.g., a median filter, a sequential statistical filter, etc.), etc.

In 708, a low-dose image may be generated based on the low-dose projection data by a second reconstruction technique. Operation 708 may be performed by the image reconstruction unit 520. Exemplary second reconstruction technique may include an iterative reconstruction technique, an analytical reconstruction technique, or the like, or a combination thereof, as described elsewhere in the disclosure. In some embodiments, the second reconstruction technique may be different from or the same as the first reconstruction technique. For example, the second reconstruction technique may include an analytical reconstruction technique, and the first reconstruction technique may include an iterative reconstruction technique. As another example, the second reconstruction technique and the first reconstruction technique may include the same iterative reconstruction technique. In some embodiments, one or more reconstruction parameters may be determined for the reconstruction of the low-dose image. Exemplary reconstruction parameters may include a field of view (FOV), a slice thickness, a reconstruction matrix, a slice gap, or the like, or a combination thereof. For example, the low-dose image may be reconstructed by applying a smaller slice thickness, a smaller reconstruction matrix, a larger FOV, a sharper reconstruction kernel, etc., compared to a reconstruction of a high-dose image.

In some embodiments, the low-dose image may exhibit a second image quality. As used herein, the second image quality may be defined by a second noise level of a low-dose or second image. The second noise level of a low-dose image may be greater than the first noise level of a corresponding high-dose image. In some embodiments, the second noise levels of low-dose images reconstructed based on the same image data but different reconstruction techniques may different. For example, the second noise level of a low-dose image reconstructed using an analytical reconstruction technique may be higher than that of a low-dose image reconstructed using an iterative reconstruction technique. In some embodiments, the second noise levels of low-dose images reconstructed based on the same image data and the same reconstruction technique but different reconstruction parameters may be different For example, the second noise level of a low-dose image reconstructed using a smaller slice thickness, a smaller reconstruction matrix, a larger FOV, etc., may be higher than that of a low-dose image reconstructed based on a same reconstruction technique using a larger slice thickness, a larger reconstruction matrix, a smaller FOV, etc.

In some embodiments, the second noise level of a low-dose image may be increased by using a filtering kernel technique for performing an image sharpening function. Exemplary filtering kernel techniques for performing an image sharpening function may include applying, for example, a linear sharpening filter (e.g., a Laplasse operator, a high frequency lifting filter, etc.), a nonlinear sharpening filter (e.g., a gradient based sharpening filter, a max-min sharpening transform, etc.), etc. In some embodiments, the second noise level of a low-dose image may be decreased by using a filtering kernel technique for performing an image smoothing function and/or using a denoising technique as described elsewhere in the disclosure.

In 710, a first neural network model may be determined based on the high-dose image and the low-dose image. In some embodiments, operation 710 may be performed by the neural network training unit 560. In some embodiments, the first neural network model may be configured to improve the quality of an image by way of, for example, reducing the noise level of an image, increasing the contrast ratio of an image, or the like, or a combination thereof. In some embodiments, the effectiveness of the first neural network model for improving the quality of an image (e.g., the function to reduce noise level) may relate to a difference between the high-dose image and the low-dose image. As used herein, the difference between the high-dose image and the low-dose image may refer to the difference between the first noise level of the high-dose image and the second noise level of the low-dose image. The larger the difference between the first noise level of the high-dose image and the second noise level of the low-dose image is, the more efficient the first neural network model may be in improving the image quality by reducing the noise level of an image generated based on the first neural network model. As another example, the lower the first noise level of the high-dose image is, the more efficient the first neural network may be in improving the image quality by reducing the noise level of a low-dose image generated based on the first neural network model. The higher the second noise level of the low-dose image is, the more efficient the first neural network may be in improving the image quality by reducing the noise level of a low-dose image generated based on the first neural network model. In some embodiments, the first neural network model may be determined by training a neural network model based on a neural network training algorithm and high-dose images and corresponding low-dose images. Exemplary neural network training algorithms may include a gradient descent algorithm, a Newton's algorithm, a Quasi-Newton algorithm, a Levenberg-Marquardt algorithm, a conjugate gradient algorithm, or the like, or a combination thereof.

In some embodiments, process 700 may be repeated with respect to multiple training data including different groups of corresponding high-dose and low-dose projection data and images to improve or optimize the first neural network model. In different rounds of process 700 performed based on different pairs of high-dose and low-dose images, the high-dose images may be obtained based on the same or different reconstruction techniques. In different rounds of process 700 performed based on different pairs of high-dose and low-dose images, the low-dose images may be obtained based on the same or different reconstruction techniques.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, process 700 may include operations for pre-processing the high-dose projection data and/or the low-dose projection data. As another example, operations 702 and 704 may be performed simultaneously or in a reverse order than that illustrated in FIG. 7, and/or operations 706 and 708 may be performed simultaneously or in a reverse order than that illustrated in FIG. 7. In some embodiments, process 700 may further including storing the high-dose image and the low-dose image in the storage 130, the terminals 140, the storage module 450, the storage unit 580, and/or other external storage devices. In some embodiments, the operations 706 and 708 may be omitted. The first neural network model may be determined based on the high-dose projection data and the low-dose projection data directly. Therefore, the first neural network model may be configured to convert an original set of projection data to a different set of projection data. The different set of projection data may exhibits a lower noise level than the original set of projection data.

Figure 8:
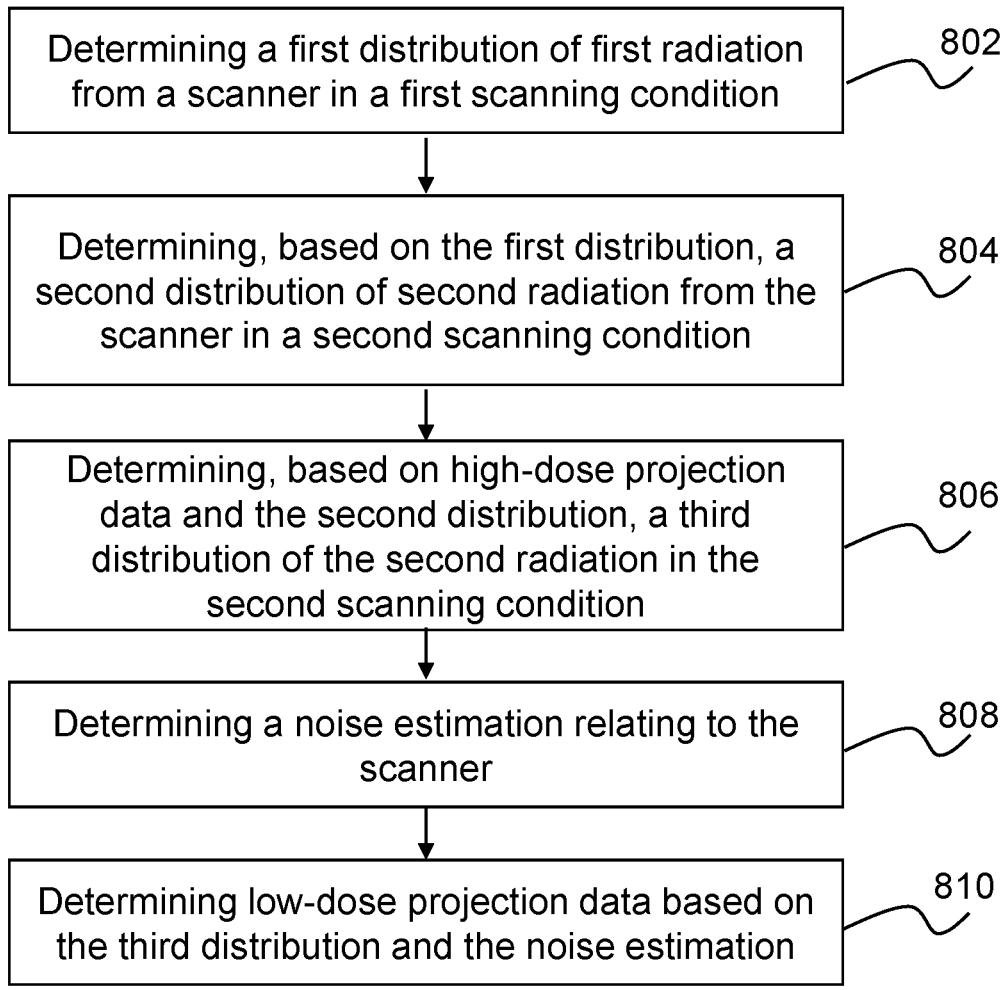
FIG. 8 is a flowchart illustrating an exemplary process for simulating low-dose projection data according to some embodiments of the present disclosure.

FIG. 8 is a flowchart illustrating an exemplary process 800 for generating simulated low-dose projection data according to some embodiments of the present disclosure. Operation 704 as illustrated in FIG. 7 may be performed according to process 800. In some embodiments, the generation of simulated projection data may relate to factors including, for example, the scanning parameters of the scanner 110, an attenuation coefficient or absorption coefficient of a subject, a scattering coefficient of a subject, the noises corresponding to the scanner 110, or the like, or a combination thereof The scanning parameters may include, for example, a response of a detector, a response of a tube, a filtration of an anti-scattering grid, a value of a tube current, a value of a tube voltage, a width of a collimation, a time of exposure (e.g., the duration of a scan), a size of focus, a flying focus mode, an integration time of the detector, etc. In some embodiments, one or more operations of process 800 illustrated in FIG. 8 for determining a first neural network model may be implemented in the CT imaging system 100 illustrated in FIG. 1. For example, the process 800 illustrated in FIG. 8 may be stored in the storage 130 in the form of instructions, and invoked and/or executed by the processing engine 120 (e.g., the processor 210 of the computing device 200 as illustrated in FIG. 2, the CPU 340 of the mobile device 300 as illustrated in FIG. 3).

In 802, a first distribution of first radiation may be determined. The first radiation may be generated by a scan using a scanner (e.g., the scanner 110) in a first scanning condition. Operation 802 may be performed by the acquisition module 410. The first distribution of the first radiation (e.g., radiation beams including X-ray photons) may refer to an incident intensity distribution of the first radiation before passing through a subject being examined. In some embodiments, the first distribution of the first radiation may be determined using detector units of the scanner. For example, the first distribution of the first radiation may be detected by the detector units of the scanner 110 when the scanner 110 performs an air scan with no subject being placed between the X-ray generator and the detector units.

In some embodiments, the first distribution of the first radiation may relate to a first dose level of the first radiation. The first dose level of the first radiation may be determined according to the first scanning condition. The first scanning condition may be defined by the values of a plurality of first scanning parameters including, such as, a value of a tube current, a value of a tube voltage, a width of a collimation, a time of exposure (e.g., the duration of a scan), a filtration of an anti-scattering grid, a response of a detector, a response of a tube (or the radiation source), a size of the focus of the tube, a flying focus mode, an integration time of the detector, etc. The first dose level of the first radiation may be determined based on the value(s) of one or more of the plurality of the first scanning parameters. For example, the greater the tube current is, the higher the first dose level may be.

In 804, a second distribution of second radiation from the scanner may be determined based on the first distribution of the first radiation. The second radiation may be virtual radiation that is simulated according to a second scanning condition. Operation 802 may be performed by the image data simulation unit 540. Similarly, the second distribution of the second radiation (e.g., X-ray photons) may refer to an incident intensity distribution of the second radiation before passing through a subject being examined.

In some embodiments, the second distribution of the second radiation may relate to a second dose level of the second radiation. The second dose level of the second radiation may be determined according to the second scanning condition. The second scanning condition may be defined by the values of a plurality of second scanning parameters including, such as, for example, a value of a tube current, a value of a tube voltage, a width of a collimation, a time of exposure (e.g., the duration of a scan), etc. The second dose level of the second radiation beam may be determined based on the values of the plurality of the second scanning parameters.

In some embodiments, the second distribution of the second radiation corresponding to the second dose level (or in the second scanning condition) may be determined based on the first distribution of the first radiation corresponding to the first dose level (or in the first scanning condition). For example, a relationship between a distribution of radiation (e.g., a number distribution of particles/photons in a radiation beam) and a scanning condition (e.g., values of scanning parameters as described above) may be determined based on the first scanning condition and the first distribution of the first radiation, and then the second distribution of the second radiation beam may be determined based on the relationship. For example, based on the first distribution of the first radiation, the second distribution of the second radiation may be determined according to a difference between the first scanning condition and the second scanning condition based on the relationship.

In 806, a third distribution of the second radiation in the second scanning condition may be determined based on the second radiation and high-dose projection data. Operation 802 may be performed by the image data simulation unit 540. As used herein, the third distribution of the second radiation beam (e.g., X-ray photons) may refer to an exiting intensity distribution of the second radiation after the second radiation passes through the subject being examined in the second scanning condition. In some embodiments, the third distribution of the second radiation beam may be determined based on the second distribution of the second radiation and an attenuation distribution of the subject. In some embodiments, the attenuation distribution of the subject may relate to a distribution of an attenuation coefficient or an absorption coefficient of different portions of the subject. The distribution of the attenuation coefficient or the absorption coefficient may be determined by, reconstructing an attenuation map of the subject based on the high-dose projection data.

Then the third distribution of the second radiation beam may be determined based on the second distribution of the second radiation and the attenuation distribution of the second radiation corresponding to the subject.

In 808, a noise estimation relating to the scanner may be determined. Operation 802 may be performed by the image data simulation unit 540. In some embodiments, the noise estimation relating to the scanner may be determined based on the detector units in the scanner. For example, the noise estimation may be performed by detecting data with the detector units in the scanner when no radiation is emitted from the scanner. The noise may include the electronic noise occurred in the circuits connected to the detector units.

In 810, low-dose projection data may be determined based on the third distribution and the noise estimation. Operation 802 may be performed by the image data simulation unit 540. In some embodiments, the low-dose projection data may refer to the projection data corresponding to the second dose-level as described in 804 and 806. In some embodiments, a Poisson distribution relating to the second radiation may be determined based on the third distribution of the second radiation. The Poisson distribution may be determined to approximate (e.g., by way of curve fitting) the third distribution. Then the low-dose projection data may be determined based on the Poisson distribution and the noise estimation.

In some embodiments, the Poisson distribution and the noise estimation may be mixed with a specific ratio to obtain the low-dose projection data. For example, the noise estimation may be represented by a first matrix including a plurality of first elements. The Poisson distribution relating to the third distribution may be represented by a second matrix including a plurality of second elements. The plurality of first elements and the plurality of second elements may be multiplied by a first weight value and a second weight value, respectively. The low-dose projection data may be determined by a weighted sum of the first weighted elements and the second weighted elements. In some embodiments, the first weight value and the second value may be in a range from 0 to 1.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operations 802 and 808 may be performed simultaneously. As another example, operation 808 may be performed before the operation 802

FIG. 9 is a flowchart illustrating an exemplary process 900 for determining a second neural network model according to some embodiments of the present disclosure. Operation 608 as illustrated in FIG. 6 may be performed according to process 900. In some embodiments, the second neural network model may be configured to improve the quality (e.g., by improving a contrast ratio) of an image. The second neural network model may be determined by training a neural network model with multiple images with relatively high quality and multiple corresponding images with relatively low quality. The multiple images with relatively high quality and multiple corresponding images with relatively low quality may be reconstructed based on the same image data but different reconstruction techniques, respectively. In some embodiments, one or more operations of process 900 illustrated in FIG. 9 for determining a first neural network model may be implemented in the CT imaging system 100 illustrated in FIG. 1. For example, the process 900 illustrated in FIG. 9 may be stored in the storage 130 in the form of instructions, and invoked and/or executed by the processing engine 120 (e.g., the processor 210 of the computing device 200 as illustrated in FIG. 2, the CPU 340 of the mobile device 300 as illustrated in FIG. 3).

In 902, projection data may be obtained. Operation 902 may be performed by the acquisition module 410. In some embodiments, the projection data may include high-dose projection data as described in connection with operation 702.

In 904, a first image may be generated based on the projection data by a third reconstruction technique. Operation 904 may be performed by the image reconstruction unit 520. The third reconstruction technique include an iterative reconstruction technique, an analytical reconstruction technique, or the like, or a combination thereof, as described elsewhere in the disclosure. In some embodiments, before a reconstruction process of the first image, one or more reconstruction parameters as described elsewhere in the disclosure may be determined. See, for example, operations 706 and/or 708 of FIG. 7 and relevant description thereof.

In 906, a second image may be generated based on the projection data by a fourth reconstruction technique. Operation 906 may be performed by the image reconstruction unit 520. The second image may have a higher contrast ratio than the first image.

In some embodiments, the fourth reconstruction technique may be different from the third reconstruction technique. For example, the third reconstruction technique may include an analytical reconstruction technique, and the fourth reconstruction technique may include an iterative reconstruction technique. In some embodiments, the reconstruction parameters used in the third reconstruction technique may be different from the reconstruction parameters used in the fourth reconstruction technique. For example, the third reconstruction technique may use a larger slice thickness, a smaller reconstruction matrix, and/or a larger FOV, compared to the fourth reconstruction technique. In some embodiments, the third reconstruction technique and the fourth reconstruction technique may be of the same type but based on different reconstruction parameters. For instance, the third reconstruction technique and the fourth reconstruction technique may be of an iterative reconstruction technique but based on different reconstruction parameters. In some embodiments, the third reconstruction technique and the fourth reconstruction technique may be of different types based on the same or different reconstruction parameters.

The denoising process or filtering kernel for performing an image smoothing function may decrease the contrast ratio of an image. The filtering kernel for performing an image sharpening function may increase the contrast ratio of an image. In some embodiments, a denoising process or a filtering kernel for performing an image smoothing function as described elsewhere in the disclosure may be used in the third reconstruction technique. See, for example, operations 706 and/or 708 of FIG. 7 and relevant description thereof. Additionally or alternatively, a filtering kernel for performing an image sharpening function as described elsewhere in the disclosure may be used in the fourth reconstruction technique. See, for example, operations 706 and/or 708 of FIG. 7 and relevant description thereof. Therefore, the second image may exhibit a higher contrast than that of the first image.

In 908, a second neural network model may be determined based on the first image and the second image. In some embodiments, operation 908 may be performed by the neural network model training unit 560. In some embodiments, the second neural network model may be configured to improve the quality of an image by way of, for example, increasing the contrast ratio of the image. The effectiveness of the second neural network for improving the contrast ratio of the image may relate to a difference between the first image and the second image. As used herein, the difference between the first image and the second image may refer to the difference between the first contrast ratio of the first image and the second contrast ratio of the second image. The larger the difference between the first contrast ratio of the first image and the second contrast ratio of the second image is, the more efficient the second neural network may be in improving the image quality by increasing the contrast ratio of an image generated based on the second neural network model. As another example, the lower the first contrast ratio of the first image is, the more efficient the second neural network may be in improving the image quality by increasing the contrast ratio of an image generated based on the second neural network model. The higher the second contrast ratio of the second image is, the more efficient the second neural network may be in improving the image quality by increasing the contrast ratio of an image generated based on the second neural network model. In some embodiments, the second neural network model may be determined by training a neural network model based on a neural network training algorithm and multiple first images and corresponding second images. Exemplary neural network training algorithm may include a gradient descent algorithm, a Newton's algorithm, a Quasi-Newton algorithm, a Levenberg-Marquardt algorithm, a conjugate gradient algorithm, or the like, or a combination thereof.

In some embodiments, process 900 may be repeated with respect to multiple training data including different projection data to improve or optimize the second neural network model. In different rounds of process 900 performed based on different pairs of high-dose and low-dose (or first and second) images, the high-dose (or first) images may be obtained based on the same or different reconstruction techniques. In different rounds of process 900 performed based on different pairs of high-dose and low-dose (or first and second) images, the low-dose (or second) images may be obtained based on the same or different reconstruction techniques.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, process 900 may include pre-processing the projection data. As another example, operations 904 and 906 may be performed simultaneously or in a reverse order than that illustrated in FIG. 9.

Figure 10:
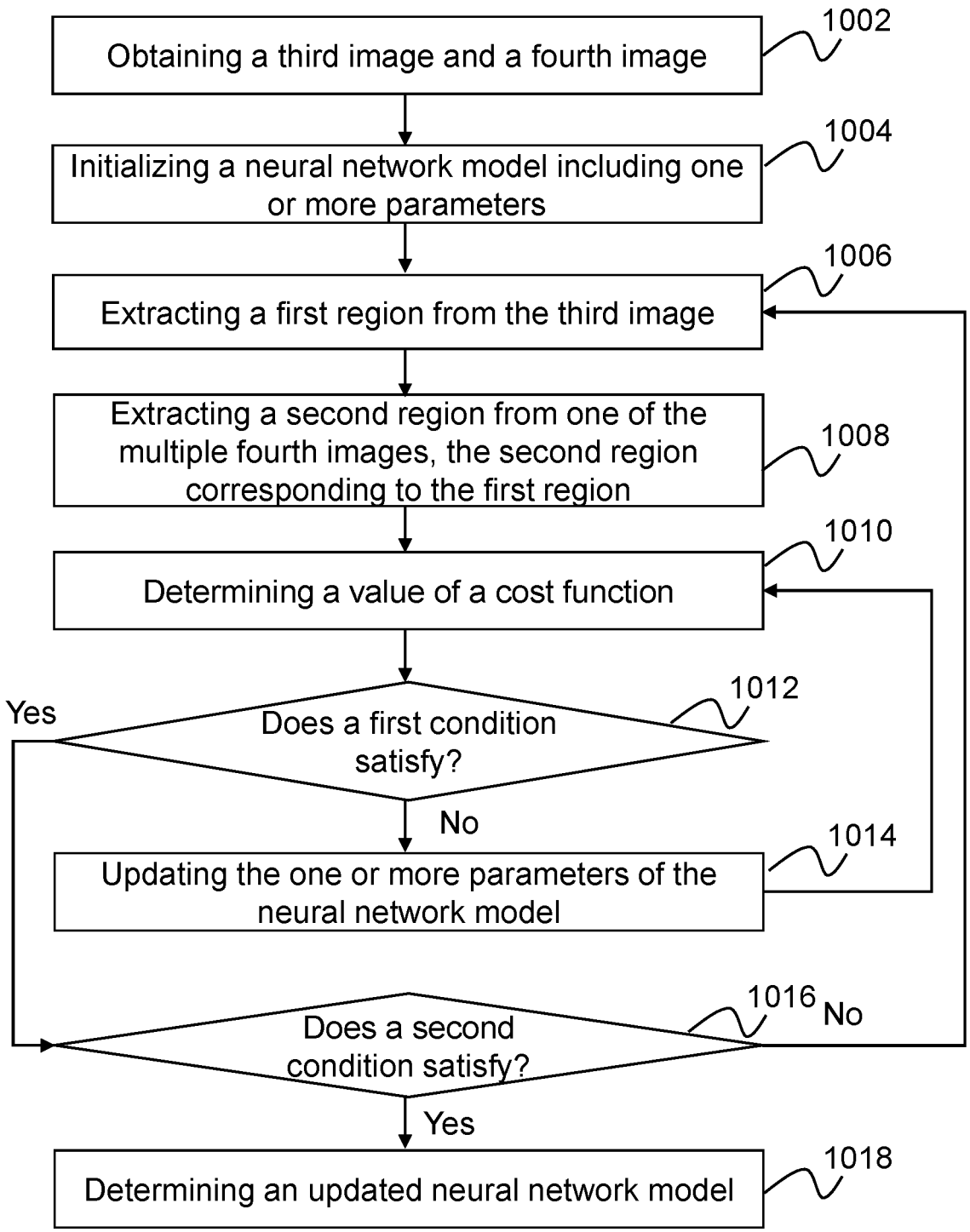
FIG. 10 is a flowchart illustrating an exemplary process 1000 for training a neural network model according to some embodiments of the present disclosure.

FIG. 10 is a flowchart illustrating an exemplary process 1000 for training a neural network model according to some embodiments of the present disclosure. Operation 710 as illustrated in FIG. 7 and/or operation 908 as illustrated in FIG. 9 may be performed according to process 1000. In some embodiments, one or more operations of process 1000 illustrated in FIG. 10 for training a neural network model may be implemented in the CT imaging system 100 illustrated in FIG. 1. For example, the process 1000 illustrated in FIG. 10 may be stored in the storage 130 in the form of instructions, and invoked and/or executed by the processing engine 120 (e.g., the processor 210 of the computing device 200 as illustrated in FIG. 2, the CPU 340 of the mobile device 300 as illustrated in FIG. 3).

In 1002, a pair of images including a third image and a fourth image may be obtained. Operation 1002 may be performed by the acquisition module 410. As used herein, the third image and the fourth image may refer to two images representing a same subject or a same region of the subject as being examined (e.g., a patient, a tissue, etc.). In some embodiments, the third image and the fourth image may correspond to a low-dose image and a high-dose image, respectively, as described in FIG. 7. In some embodiments, the third image and the fourth image may correspond to a first image and a second image, respectively, as described in FIG. 9.

In 1004, a neural network model including one or more parameters may be initialized. Operation 1004 may be performed by the initialization block 562. In some embodiments, the initialization of the neural network model may include constructing the neural network model based on a convolutional neural network (CNN), a recurrent neural network (RNN), a long short-term memory (LSTM), a generative adversarial network (GAN), or the like, or a combination thereof, as exemplified in FIG. 11 and the description thereof. In some embodiments, the neural network model may include multiple layers, for example, an input layer, multiple hidden layers, and an output layer. The multiple hidden layers may include one or more convolutional layers, one or more batch normalization layers, one or more activation layers, a fully connected layer, a cost function layer, etc. Each of the multiple layers may include a plurality of nodes.

In some embodiments, the parameters of the neural network model may include the size of a convolutional kernel, the number of layers, the number of nodes in each layer, a connected weight between two connected nodes, a bias vector relating to a node, etc. The connected weight between two connected nodes may be configured to represent a proportion of an output value of a node to be as an input value of another connected node. In some embodiments, the connected weights of the neural network model may be initialized to be random values in a range, e.g., the range from −1 to 1. In some embodiments, all the connected weights of the neural network model may have a same value in the range from −1 to 1, for example, 0. The bias vector relating to a node may be configured to control an output value of the node deviating from an origin. In some embodiments, the bias vector of nodes in the neural network model may be initialized to be random values in a range from 0 to 1. In some embodiments, the parameters of the neural network model may be initialized based on a Gaussian random algorithm, a xavier algorithm, etc.

In 1006, a first region may be extracted from the third image. Operation 1006 may be performed by the extraction block 564. In some embodiments, the first region may be extracted according to, for example, a size of the first region, a position of the first region, etc. For example, a first position may be determined in the first image, then the first region with a specific size may be extracted at the first position from the first image. In some embodiments, the first region may be extracted based on a random sampling algorithm. Exemplary random sampling algorithms may include an acceptance-rejection sampling algorithm, an importance sampling algorithm, a Metropolis-Hasting algorithm, a Gibbs sampling algorithm, etc. In some embodiments, the first region may be extracted based on an instruction provided by a user via the terminals 140. For example, the user may determine a coordinate of the first position in the first image and a specific size of the first region, and then the extraction block 564 may extract the first region based on the first position and the specific size of the first region.

In 1008, a second region corresponding to the first region may be extracted from the fourth image. Operation 1008 may be performed by the extraction block 564. As used herein, the second region corresponding to the first region may refer to that the first region and the second region may be of the same size and at the same position in the third image and the fourth image, respectively. In some embodiments, the second region may be extracted based on the first region. For example, the third image may be divided into multiple first image blocks according to a division rule, for example, an even division. The multiple first image blocks may be numbered according to a numbering rule, for example a position of each of the multiple first image blocks. A first block with a specific number may be extracted from the multiple first image blocks and designated as the first region. The fourth image may be divide into multiple second image blocks with the same division rule as the first image. Each of the multiple second image blocks may be numbered with the same numbering rule as the first image. A second block with the same number as the extracted first region may be extracted from the multiple second image blocks and designated as the second region. As another example, the position of the first/second region with respect to the third/fourth image may relate to the location of the first/second region stored in a storage, e.g., the storage unit 580. The second region with respect to the fourth image may be determined according to the location of the first region with respect to the third image in the storage.

Figure 11:
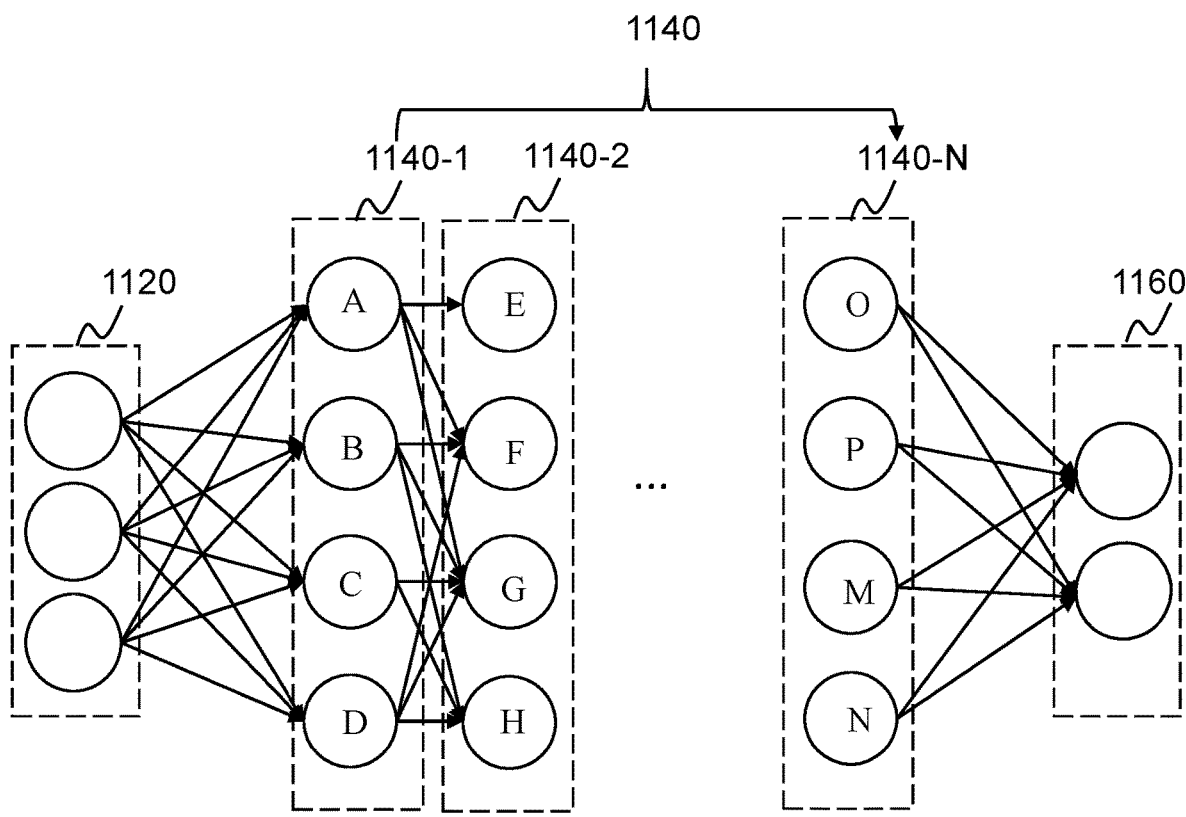
FIG. 11 is a schematic diagram illustrating an exemplary neural network model according to some embodiments of the present disclosure.

In 1010, a value of a cost function (also referred to as a loss function) may be determined. Operation 1010 may be performed by the calculation block 566. The cost function may be configured to assess a difference between a testing value (e.g., the first region of the third image) of the neural network and a desired value (e.g., the second region of the fourth image). In some embodiments, the first region of the third image may be inputted to the neural network model via an input layer (e.g., the input layer 1120 as illustrated in FIG. 11). The first region of the third image may be transferred from a first hidden layer of the neural network model (e.g., the conventional layers 1140-1 as illustrated in FIG. 11) to the last hidden layer of the neural network model. The first region of the third image may be processed in each of the multiple hidden layers. For example, the inputted first region of the third image may be processed by one or more conventional layer (e.g., the conventional layers 1140-1 as illustrated in FIG. 11). The one or more conventional layers may be configured to perform an image transformation operation, an image enhancement operation, an image denoising operation, or any other operations on the first region of the third image based on the parameters relating to nodes in the one or more conventional layers. The processed first region of the third image processed by the hidden layers before the cost function layer may be inputted to the cost function layer. The value of the cost function layer may be determined based on the processed first region of the third image processed by the layers before the cost function layers and the second region of the fourth image.

In 1012, a determination may be made as to whether a first condition is satisfied. Operation 1012 may be performed by the judgment block 568. If the first condition is satisfied, process 1012 may proceed to operation 1016. If the first condition is not satisfied, process 1000 may proceed to 1014. The first condition may provide an indication whether the neural network model is sufficiently trained * * *. In some embodiments, the first condition may relate to a value of the cost function. For example, the first condition may be satisfied if the value of the cost function is minimal or smaller than a threshold (e.g., a constant). As another example, the first condition may be satisfied if the value of the cost function converges. In some embodiments, convergence may be deemed to have occurred if the variation of the values of the cost function in two or more consecutive iterations is equal to or smaller than a threshold (e.g., a constant). In some embodiments, convergence may be deemed to have occurred if a difference between the value of the cost function and a target value is equal to or smaller than a threshold (e.g., a constant). In some embodiments, the first condition may be satisfied when a specified number of iterations relating to the first region of the third image and the second region of the fourth image are performed in the training process.

In 1014, the one or more parameters of the neural network model may be updated. Operation 1014 may be performed by the initialization block 562. In some embodiments, the parameter value of at least some nodes may be adjusted until the value of the cost function relating to the first region of the third image satisfy the first condition. In some embodiments, the parameters of the neural network model may be adjusted based on a back-propagation (BP) algorithm. Exemplary BP algorithms may include a stochastic gradient descent algorithm, an Adam algorithm, an Adagrad algorithm, an Adadelta algorithm, an RMSprop algorithm, or the like, or a combination thereof.

In 1016, a determination may be made as to whether the second condition is satisfied. Operation 1016 may be performed by the judgment block 568. If the second condition is satisfied, process 1000 may proceed to 1018. If the second condition is not satisfied, process 1000 may return to 1004, another first region may be extracted from the third image. In some embodiments, the second condition may be satisfied if a specified number of the first regions and the second regions are processed associated with the neural network model.

In 1018, an updated neural network model may be determined. Operation 1018 may be performed by the initialization block 562. In some embodiments, the updated neural network model may be determined based on the updated parameters.

In some embodiments, process 1000 may be repeated with respect to multiple training data including different pairs of third and fourth images to improve or optimize the neural network model. In different rounds of process 1000 performed based on different pairs of third and fourth images, the third images may be obtained based on the same or different reconstruction techniques. In different rounds of process 1000 performed based on different pairs of third and fourth images, the fourth images may be obtained based on the same or different reconstruction techniques. Except for the first round of process 1000, in a subsequent round of process 1000, the initialization of the neural network model in 1004 may be performed based on the updated parameters of the neural network model obtained in a preceding round.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, process 1000 may be performed repeatedly based on multiple third images and fourth images to obtain the first neural network model and/or the second neural network model. The training process may be performed until a termination condition is satisfied. An exemplary termination condition is that a specific number of pairs of third images and fourth images have been analyzed.

FIG. 11 is a schematic diagram illustrating an exemplary convolutional neural network (CNN) model according to some embodiments of the present disclosure.

The CNN model may include an input layer 1120, hidden layers 1140, and an output layer 1160. The multiple hidden layers 1140 may include one or more convolutional layers, one or more Rectified Linear Units layers (ReLU layers), one or more pooling layers, one or more fully connected layers, or the like, or a combination thereof.

For illustration purposes, exemplary hidden layers 1140 of the CNN model, including a convolutional layer 1140-1, a pooling layer 1140-2, and a fully connected layer 1140-N, are illustrated. As described in connection with process 708, the neural network training unit 560 may acquire a low-dose image as an input of the CNN model. The low-dose image may be expressed as a two-dimensional (2D) or three-dimensional (3D) matrix including a plurality of elements (e.g., pixels or voxels). Each of the plurality of elements in the matrix may have a value (also referred to as pixel/voxel value) representing a characteristic of the element.

The convolutional layer 1140-1 may include a plurality of kernels (e.g., A, B, C, and D). The plurality of kernels may be used to extract features of the low-dose image. In some embodiments, each of the plurality of kernels may filter a portion (e.g., a region) of the low-dose image to produce a specific feature corresponding to the portion of the low-dose image. The feature may include a low-level feature (e.g., an edge feature, a texture feature), a high-level feature, or a complicated feature that is calculated based on the kernel(s).

The pooling layer 1140-2 may take the output of the convolutional layer 1140-1 as an input. The pooling layer 1140-2 may include a plurality of pooling nodes (e.g., E, F, G, and H). The plurality of pooling nodes may be used to sample the output of the convolutional layer 1140-1, and thus may reduce the computational load of data processing and increase the speed of data processing of the CT imaging system 100. In some embodiments, the neural network training unit 560 may reduce the volume of the matrix corresponding to the low-dose image in the pooling layer 1140-2.

The fully connected layer 1140-N may include a plurality of neurons (e.g., O, P, M, and N). The plurality of neurons may be connected to a plurality of nodes from the previous layer, such as a pooling layer. In the fully connected layer 1140-N, the neural network training unit 560 may determine a plurality of vectors corresponding to the plurality of neurons based on the features of the low-dose image and further weigh the plurality of vectors with a plurality of weighting coefficients.

In the output layer 1160, the neural network training unit 560 may determine an output, such as a high-dose image, based on the plurality of vectors and weighting coefficients obtained in the fully connected layer 708.

It shall be noted that the CNN model may be modified when applied in different conditions. For example, in a training process, a loss function (also referred to as cost function in the disclosure) layer may be added to specify the deviation between a predicted output (e.g., a predicted high-dose image) and a true label (e.g., a reference high-dose image corresponding to the low-dose image).

In some embodiments, the neural network training unit 560 may get access to multiple processing units, such as GPUs, in the CT imaging system 100. The multiple processing units may perform parallel processing in some layers of the CNN model. The parallel processing may be performed in such a manner that the calculations of different nodes in a layer of the CNN model may be assigned to two or more processing units. For example, one GPU may run the calculations corresponding to kernels A and B, and the other GPU(s) may run the calculations corresponding to kernels C and D in the convolutional layer 1140-1. Similarly, the calculations corresponding to different nodes in other type of layers in the CNN model may be performed in parallel by the multiple GPUs.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2103, Perl, COBOL 2102, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various inventive embodiments. This method of disclosure, however, is not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A method implemented on a computing device having at least one processor and at least one computer-readable storage medium, the method comprising:
   obtaining a first set of projection data with respect to a first dose level acquired by a scanner;
   reconstructing, based on the first set of projection data, a first image;
   determining, based on the first set of projection data, a second set of projection data, the second set of projection data relating to a second dose level that is lower than the first dose level, wherein the second set of p oiection data is determined according to operations including:
      determining a first distribution of radiation with respect to the second dose level before the radiation passing through a subject;
      determining, based on the first distribution of the radiation and the first set of projection data, a second distribution of the radiation after the radiation passing through the subject:
      determining a noise estimation of the scanner; and
      determining, based on the second distribution of the radiation and the noise estimation, the second set of projection data;
   reconstructing, based on the second set of projection data, a second image; and
   training a first neural network model based on the first image and the second image.

2. The method of claim 1, wherein the first neural network model is structured based on at least one of a Convolutional Neural Network (CNN), a Recurrent Neural Network (RNN), a Long Short-Term Memory (LSTM), or a Generative Adversarial Network (GAN).

3. The method of claim 1, wherein the first image is reconstructed based on an iterative reconstruction algorithm with first reconstruction parameters, the second image is reconstructed based on an analytical reconstruction algorithm or an iterative reconstruction algorithm with second reconstruction parameters, and the second reconstruction parameters are at least partially different from the first parameters.

4. The method of claim 1, wherein the first image is reconstructed by applying at least one of a larger slice thickness, a larger reconstruction matrix, or a smaller FOV, compared to the reconstruction of the second image.

5. The method of claim 1, wherein the first distribution of radiation is determined based on at least one of a scanning parameter of the scanner that acquires the first projection data, an attenuation coefficient relating to a subject, and noises corresponding to the scanner, a response of a tube, a response of a detector of the scanner, a size of a focus of the scanner, a flying focus of the scanner, an integration time of the detector of the scanner, or a scattering coefficient of the subject.

6. The method of claim 1, wherein the determining the noise estimation comprises:
   detecting a response of detectors in the scanner when no radiation is emitted from the scanner.

7. The method of claim 1, wherein the training the first neural network model based on the first image and the second image comprises:
   extracting, from the first image, a first region;
   extracting, from the second image, a second region corresponding to the first region in the first image, the first region in the first image having a same size as the second region; and
   training the first neural network model based on the first region in the first image and the second region in the second image.

8. The method of claim 7, wherein the training the firstneural network model based on the first region in the first image and the second region in the second image comprises:
   initializing parameter values of the first neural network model;
   iteratively determining, at least based on the first region in the first image and the second region in the second image, a value of a cost function relating to the parameter values of the first neural network model in each iteration, including updating at least some of the parameter values of the first neural network model after each iteration based on an updated value of the cost function obtained in a most recent iteration; and
   determining the trained first neural network model until a condition is satisfied.

9. The method of claim 8, wherein the condition includes that a variation of the values of the cost function among a plurality of iterations is below a threshold, or a threshold number of the iterations have been performed.

10. The method of claim 1, furthering comprising:
    training a second neural network model, wherein the second neural network model is trained based on a sixth image and a seventh image, wherein the sixth image is reconstructed based on a third set of projection data, wherein the seventh image is reconstructed based on the third set of projection data, wherein an image quality of the seventh image is greater than that of the sixth image, the image quality relating to at least one of a contrast ratio and a spatial resolution.

11. The method of claim 10, wherein the third set of projection data includes the first set of projection data.

12. The method of claim 1, wherein a dimension of the first image or the first neural network model is no less than two.

13. The method of claim 1, wherein the first dose level is 5 mSv or above, or 15 mSv or above.

14. The method of claim 1, wherein the second dose level is no more than 10% of the first dose level, or no more than 40% of the first dose level.

15. A method implemented on a computing device having at least one processor and at least one computer-readable storage medium, the method comprising:
- obtaining a first set of projection data with respect to a first dose level acquired by a scanner;
- determining, based on a first neural network model and the first set of projection data, a second set of projection data with respect to a second dose level that is higher than the first dose level, the first neural network model being configured to convert low-dose projection data into high-dose projection data corresponding to the low-dose projection data;
- generating, based on the second set of projection data, a first image; and
- generating, based on a second neural network model and the first image, a second image.

16. The method of claim 15, wherein the first neural network is generated by:
- obtaining a third set of projection data with respect to a third dose level;
- simulating, based on the third set of projection data, a fourth set of projection data, the fourth set of projection data relating to a fourth dose level that is lower than the third dose level; and
- training the first neural network model based on the third set of projection data and the fourth set of projection data.

17. The method of claim 16, wherein the simulating the fourth set of projection data comprises:
- determining a first distribution of a radiation with respect to the fourth dose level before the radiation passing through a subject;
- determining, based on the first distribution of the radiation and the third set of projection data, a second distribution of the radiation after the radiation passing through the subject;
- determining a noise estimation of the scanner that acquires the first set of projection data; and
- simulating, based on the second distribution of the radiation and the noise estimation, the fourth set of projection data.

18. The method of claim 15, wherein the second neural network is generated by
- obtaining a third image, the third image being reconstructed based on a fifth set of projection data,
- obtaining a fourth image, the fourth image being reconstructed based on the fifth set of projection data, and
- training the second neural network model based on the third image and the fourth image, wherein an image quality of the fourth image is greater than that of the third image, the image quality relating to at least one of a contrast ratio and a spatial resolution.

19. A system, comprising:
a computer-readable storage medium storing executable instructions, and at least one processor in communication with the computer-readable storage medium, when executing the executable instructions, causing the system to implement a method comprising:
- obtaining a first set of projection data with respect to a first dose level;
- reconstructing, based on the first set of projection data, a first image;
- determining, based on the first set of projection data, a second set of projection data, the second set of projection data relating to a second dose level that is lower than the first dose level, wherein the second set of projection data is determined according to operations including:
  - determining a first distribution of radiation with respect to the second dose level before the radiation passing through a subject;
  - determining, based on the first distribution of the radiation and the first set of projection data, a second distribution of the radiation after the radiation passing through the subject;
  - determining a noise estimation of the scanner; and
  - determining, based on the second distribution of the radiation and the noise estimation, the second set of projection data;
- reconstructing, based on the second set of projection data, a second image; and
- training a first neural network model based on the first image and the second image.

20. The method of claim 1, wherein the trained first neural network model is configured to convert a third image to a fourth image, the fourth image exhibiting a lower noise level than the third image, wherein an effectiveness of the first neural network model for lowering the noise level of the fourth image is associated with a difference between the first noise level and the second noise level.

* * * * *